United States Patent
Keselman et al.

(10) Patent No.: US 11,474,529 B2
(45) Date of Patent: Oct. 18, 2022

(54) SYSTEM AND METHOD FOR MOTION PLANNING OF AN AUTONOMOUS DRIVING MACHINE

(71) Applicant: IMAGRY (ISRAEL) LTD., Haifa (IL)

(72) Inventors: Ariel Keselman, Kiryat Tiv'on (IL); Sergey Ten, Haifa (IL); Majed Jubeh, Shefa-'Amr (IL); Adham Ghazali, Haifa (IL)

(73) Assignee: IMAGRY (ISRAEL) LTD., Haifa (IL)

( * ) Notice: Subject to any disclaimer, the term of this patent is extended or adjusted under 35 U.S.C. 154(b) by 1032 days.

(21) Appl. No.: 16/136,301

(22) Filed: Sep. 20, 2018

(65) Prior Publication Data
US 2020/0097015 A1     Mar. 26, 2020

(51) Int. Cl.
*G05D 1/02* (2020.01)
*G05D 1/00* (2006.01)
*G06N 3/08* (2006.01)
*G06F 16/22* (2019.01)

(52) U.S. Cl.
CPC ......... *G05D 1/0221* (2013.01); *G05D 1/0088* (2013.01); *G06F 16/2246* (2019.01); *G06N 3/08* (2013.01); *G05D 2201/0213* (2013.01)

(58) Field of Classification Search
CPC .............................. G05D 1/0221; G06N 3/08
See application file for complete search history.

(56) References Cited

U.S. PATENT DOCUMENTS

| 10,671,076 B1* | 6/2020 | Kobilarov | ............... G08G 1/166 |
| 2018/0032863 A1* | 2/2018 | Graepel | ............... G06N 3/0454 |
| 2018/0089563 A1* | 3/2018 | Redding | ................... G06N 3/08 |

FOREIGN PATENT DOCUMENTS

| WO | WO-2018102425 A1 * | 6/2018 | ............ B60W 10/18 |

OTHER PUBLICATIONS

"Wikipedia, Bellman Equation, May 28, 2017, The Way Back Machine, p. 6 under 'Example' section" (Year: 2017).*

* cited by examiner

*Primary Examiner* — Jeff A Burke
*Assistant Examiner* — Christopher A Buksa

(57) ABSTRACT

Producing a motion planning policy for an Autonomous Driving Machine (ADM) may include producing a search tree, including a root node representing a current condition of the ADM and derivative nodes linked thereto, representing predicted conditions of the ADM, following application of an action on the ADM. The nodes may be interlinked by actions and associated quality factors. A neural network (NN) may select a plurality of quality factors. The search tree may be expended to add interlinked derivative nodes according to the NN's selection, until a terminating condition is met. Backward propagating and updating one or more quality factors along trajectories of the expanded tree may occur. The NN may be trained according to the current condition of the ADM and the updated quality factors to select an optimal action. The selected optimal action may be applied on at least one physical element of the ADM.

20 Claims, 12 Drawing Sheets

SYSTEM AND METHOD FOR MOTION PLANNING OF AN AUTONOMOUS DRIVING MACHINE

FIELD OF THE INVENTION

The present invention relates generally to autonomous systems. More specifically, the present invention relates to a system and a method for motion planning of an autonomous driving machine.

BACKGROUND OF THE INVENTION

Recent years have seen the proliferation of implementations of motion planning algorithms for autonomous car driving.

Some implementations include employment of various tree parsing algorithms, such as the A* (commonly referred to as "A-star" in the art) tree search algorithm and the Monte-Carlo Tree Search (MTCS) algorithm, but do not combine the benefits of this art with deep learning neural networks.

Other methods for combining neural networks with Reinforcement Learning (RL) for autonomous car driving use policy-gradient or a variation of actor-critics RL methods, but do not combine the tree search algorithms with Deep Reinforcement learning.

Contemporary studies have produced computer programs that employ a combination of a tree search algorithm (e.g., MCTS) with Deep Reinforcement Learning, and may be capable of playing intellectual board games (e.g., Go) on a superhuman level of intelligence. However, these methods are only valid for fully observable discrete systems and may not be directly applied to partially observable physical systems like an autonomous car.

SUMMARY OF THE INVENTION

Some embodiments include a system and a method for producing a policy of motion planning of an autonomous driving machine, that may be applied to a periodic, partially observable physical environment, and may combine the benefits of an adaptive tree-search algorithm with those of a deep reinforcement learning system.

Embodiments of the present invention may include a method of producing a motion planning policy for an Autonomous Driving Machine (ADM) by at least one processor. The method may include:
a) creating a first node, such as a root node of a search tree, that may include a temporal data set, that may correspond to at least a condition (e.g., speed, location, orientation and the like) of the ADM;
b) selecting, by a neural network (NN), a quality factor associated with the first node (e.g., root node) and with an action from a set of actions;
c) producing, by a simulator at least one second node and a respective reward factor, where the second node may correspond with a predicted condition of the ADM following application of the selected action, and where the at least one second node may be associated with the first node by the selected action and by the reward factor;
d) repeating steps b and c, to expand the search tree until a predefined termination condition is met;
e) updating at least one quality factor by computing optimal sums of rewards along one or more trajectories in the expanded search tree; and
f) training the NN to select at least one action according to at least one of: the temporal data set and the at least one updated quality factor.

According to some embodiments, the search tree may be expanded by a global, deterministic tree traversal algorithm, and the quality factor received from the neural network may serve as an expansion heuristic, to select one or more actions of the actions' set. In some embodiments, the NN may produce two or more quality factors, and the simulator may expand the search tree along the two or more actions associated with the quality factors selected by the NN.

According to some embodiments the at least one quality factor may be updated by backward-propagating along one or more trajectories of the expanded tree and accumulating optimal rewards according to Bellman's equation. The tree traversal algorithm may be, for example one of an A-star (A*) tree-search algorithm and an epsilon-greedy tree-search algorithm.

According to some embodiments, the search tree may be expanded by a local, probabilistic tree traversal algorithm. For example, the NN may produce a single quality factor, and the simulator may expand the tree along a single trajectory. The at least one quality factor may be updated by accumulating the rewards along nodes of the trajectory of the expanded tree.

The temporal data set may correspond with at least one feature of the real world, including for example: a condition of the ADM, a characteristic of the ADM, a condition of the road, and a characteristic of the road.

According to some embodiments, data of the real world may be repeatedly sampled by at least one sensor, according to a preset period of time. An abstraction of the sampled data may be applied, to produce the temporal data set therefrom. At least one feature of the temporal data set corresponding to a feature of the real world may be extracted, and the first node of the search tree may correspond with the at least one feature of the real world.

Embodiments may include producing the temporal data set, corresponding with at least one feature of the real world by a simulator.

Embodiments of the present invention may include: (a) receiving a temporal data set; (b) selecting, by the neural network at least one action of the actions' set according to the training of the neural network, and according to the received data set; (c) applying the selected action to at least one element of the ADM; and (d) repeating steps a through c, to continuously conduct or drive the ADM in response to the received temporal data sets.

Embodiments of the present invention may include a method for producing a motion planning policy for an Autonomous Driving Machine (ADM). The method may include producing, by a simulator, a search tree that may include a root node and plurality of derivative nodes, linked to the root node. The root node represents a current condition of the ADM, and each derivative node may represent a predicted condition of the ADM, following application of an action on the ADM. The nodes may be interlinked (e.g., to form a search tree) by the actions and associated quality factors.

Embodiments of the method may further include:
selecting, by a NN, a plurality of quality factors;
expanding the search tree by the simulator to add interlinked derivative nodes according to the NN's selection, until a terminating condition is met;
backward propagating along one or more trajectories of the expanded tree, to update a value of one or more quality factors;

training the NN according to the current condition of the ADM and the updated one or more quality factors to select an optimal action; and applying the selected optimal action on at least one physical element of the ADM.

The simulator may be further configured to attribute a numerical reward value to each action, and wherein updating the at least one quality factor may be performed by accumulating optimal reward values according to Bellman's equation.

Embodiments of the present invention may include a system for producing a motion planning policy for an ADM. Embodiments of the system may include a non-transitory memory device, wherein modules of instruction code are stored, and a processor associated with the memory device, and configured to execute the modules of instruction code, whereupon execution of said modules of instruction code, the processor may be further configured to perform methods of the present invention, as elaborated herein.

Embodiments of the present invention may include a method of autonomously driving an ADM.

Embodiments of the method may include creating a first node (e.g., a root node) of a search tree, that may include at least one first data set corresponding with at least a condition of the ADM and a second temporal data set corresponding with characteristics of a road (e.g., a map of a portion of the road, including a location of the ADM in relation to the portion of the road).

Embodiments of the method may further include:

a) selecting, by a neural network, a quality factor, associated with the first node and an associated action from a set of actions;

b) producing, by a simulator at least one second node and a respective reward factor, wherein the second node corresponds with a predicted condition of the ADM following application of the selected action, and wherein the second node may be associated with the first node by the selected action and by the reward factor;

c) repeating steps a and b, to expand the search tree until a termination condition is met;

d) updating at least one quality factor by computing optimal sums of rewards along one or more trajectories in the expanded search tree;

e) selecting, by the NN, at least one action of the predefined selectable actions set according to the at least one updated quality factors and applying the selected action to at least one element of the ADM; and f) repeating steps a through g to continuously conduct or drive the ADM in response to the received data sets.

Embodiments of the method may include producing (e.g., by mapper module 210 of FIG. 2, as explained herein) a real-world map of the ADM and its surroundings. The mapper may receive an abstraction of at least one real-world feature and produce a map of a portion of a road upon which the ADM is driving. The real-world map may include the relation of ADM to at least one of the real-world road and real-world objects included therein. The second temporal data set may include data of the real-world map.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
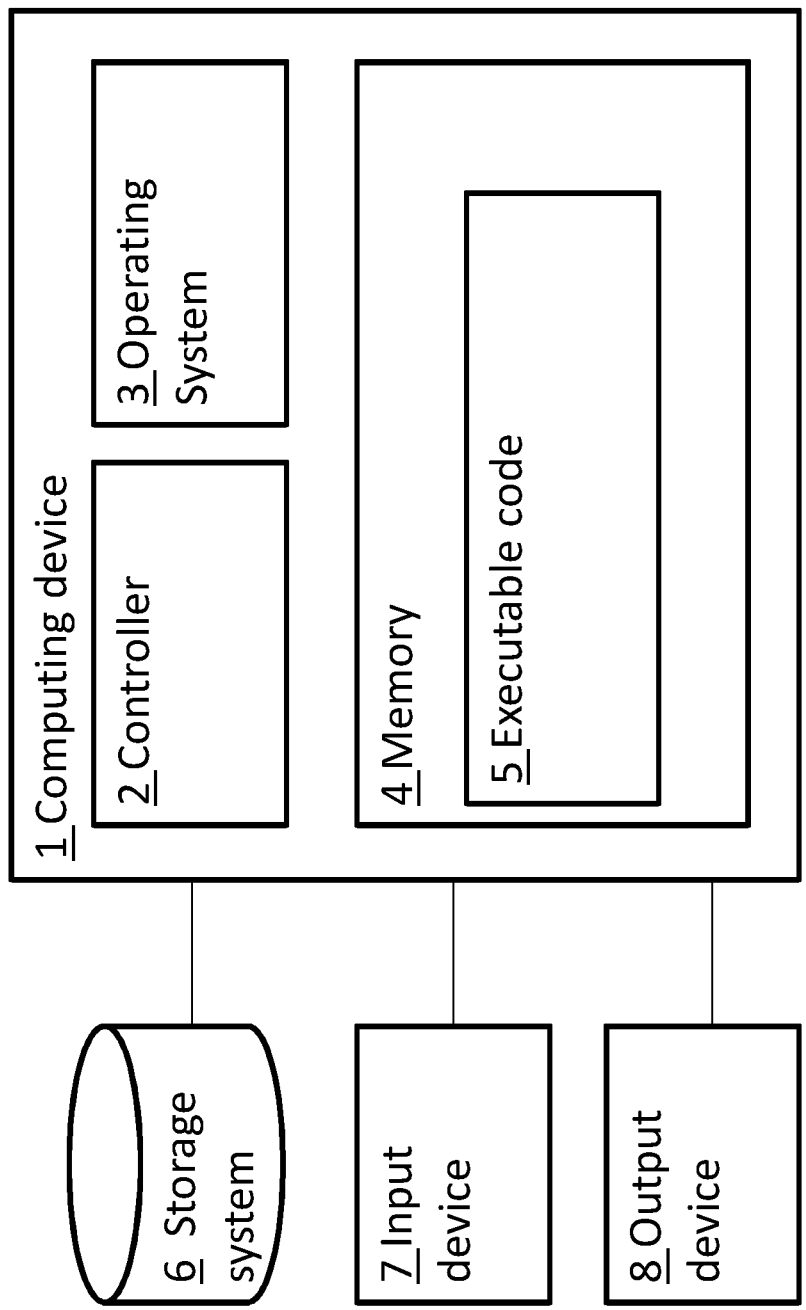
FIG. 1 is a block diagram, depicting a computing device, which may be included within an embodiment of a system for motion planning of an autonomous driving machine, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for training and employing an autonomously driving machine (ADM), for example a self-driving automobile or truck. An embodiment may include a training stage or mode and an autonomous driving stage or mode. Embodiments of the system may include a search tree module and a deep neural network, adapted to facilitate efficient training of the system to produce a driving policy for motion planning on an autonomous driving machine, as explained herein.

Embodiments of the present invention may include a system, including at least a search tree and a neural network. The search tree may include one or more nodes, each representing a condition of the ADM, and the neural network may be adapted to implement a process of deep reinforcement learning, such as deep Q-learning, as known in the art, to produce the policy for motion planning, as elaborated herein.

The term "policy" is commonly used in the art of machine reinforcement learning, in the context of teaching a system (commonly referred to as an "agent") to select an action, in view of a presented condition or circumstance. The term "driving policy", or "policy" in short is used herein in a similar manner, to refer to a set of decisions that may be taken by embodiments of the system in response to a given condition of the ADM and/or its surroundings and may result in taking specific actions in response to the given condition. For example, the driving policy may dictate that the ADM would take specific actions (e.g., accelerate, turn, brake, etc.) in response to the ADM's characteristics (e.g., size, weight steering profile, etc.), road characteristics (e.g., curvature, width, etc.), ADM's condition (e.g., speed, inclination, orientation, etc.) and road condition (e.g., existence of objects on the road, pedestrians, cars, other ADMs, etc.). In some embodiments, the policy may include prioritization and/or preference of actions in view of a given condition of the ADM and/or the ADM's environment. For example, prioritizing the avoidance of human pedestrians, driving the ADM at low speed when the road is curved or wet, and the like.

Reference is now made to FIG. 1, which is a block diagram depicting a computing device, which may be included within an embodiment of a system for motion planning of an autonomous driving machine, according to some embodiments.

Computing device 1 may include a controller 2 that may be, for example, a central processing unit (CPU) processor, a graphics processing unit (GPU), an application-specific integrated circuit (ASIC), a field-programmable gate array (FPGA) or any combination thereof, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that enforces security in a vehicle as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2, GPU, ASIC, FPGA or any combination thereof), a plurality of input units, a plurality of output units, a plurality of memory units, and a plurality of storage units.

Figure 2:
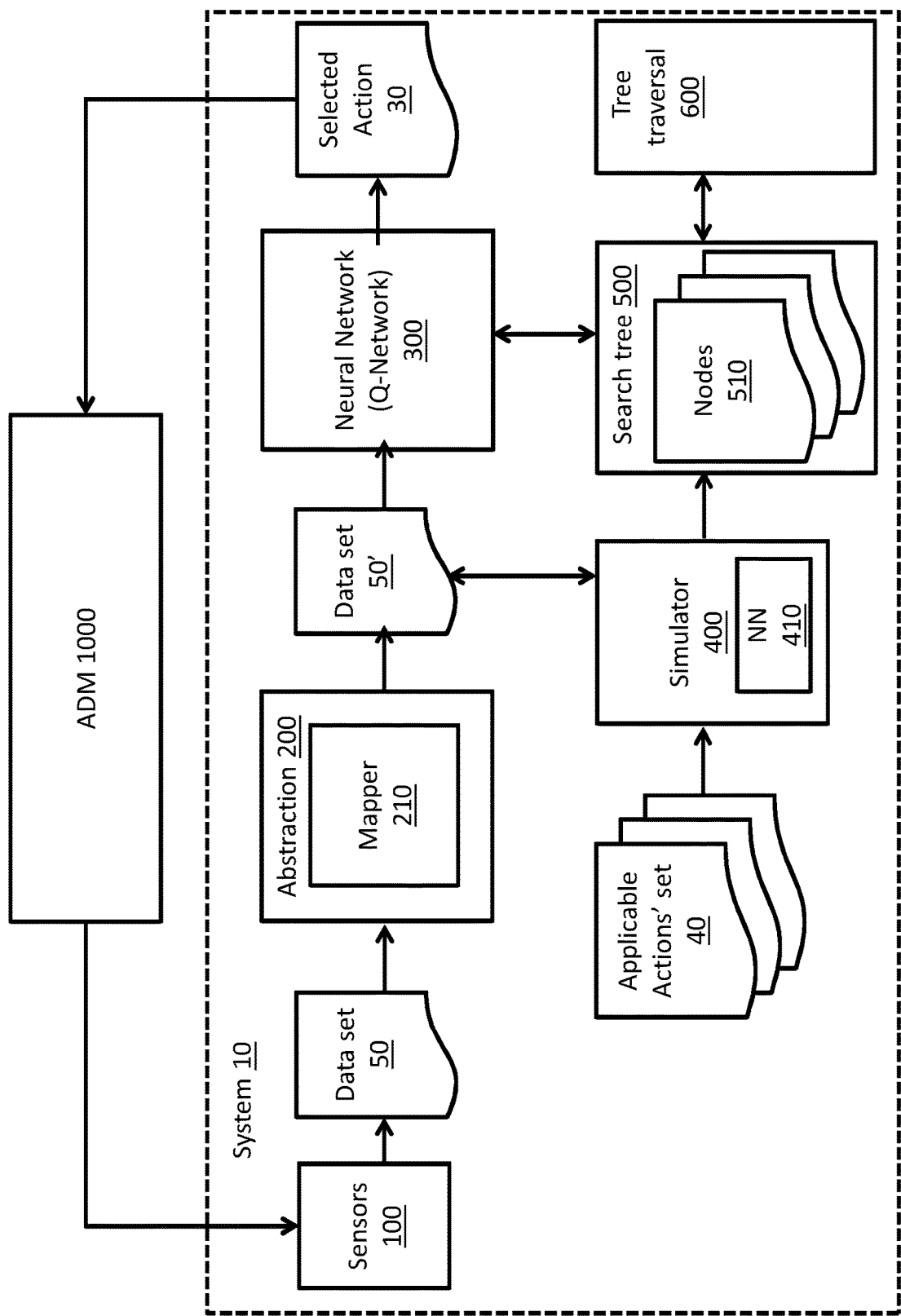
FIG. 2 is a block diagram, depicting a system for motion planning of an autonomous driving machine (ADM), according to some embodiments.

Reference is now made to FIG. 2, which depicts a system 10 for motion planning of an autonomous driving machine (ADM) 1000, according to some embodiments.

An ADM (e.g., an autonomous vehicle such as a car, bus, truck, etc.) may be characterized by a plurality of physical motion properties, such as speed, orientation, gear selection and the like. System 10 may apply actions 30 on ADM 1000 (e.g., change a steering wheel orientation, change a gasoline throttle level, change a gear selection, etc.), to configure ADM 1000 to adapt or modify one or more motion properties, as explained herein.

The term 'actions' refers herein to a combination of one or more configurations that may change at least one motion property of ADM 1000. For example, a first action 30 may include steering ADM 1000 steering wheel or steering system (possibly separate from any steering wheel) by a predefined quantity (e.g., 10 degrees) in a predefined direction (e.g. in the left direction). In another example, action 30 may include a combination of configurations that may correspond with a motion property that may be required by system 10, such as decreasing ADM 1000 speed by combining a reduction of the throttle level and selection of a lower gear.

In some embodiments, system 10 may apply actions 30 directly on at least one physical element of ADM 1000. Alternately, system 10 may produce actions 30 as messages to a controller (not shown) that may be configured to control at least one element of ADM 1000 (e.g. a gas throttle, a gear selection box, etc.) to apply required actions 30.

As shown in FIG. 2, system 10 may include at least one input source, configured to produce a temporal data set. The at least one input source may including at least one sensor 100, and/or at least one simulator 400 module. System 10 may be configured to analyze an input temporal data set 50' originating from the at least one input source to produce at least one action 30, corresponding with a configuration of an autonomous driving machine.

For example, simulator 400 may be configured to produce a temporal data set corresponding with at least one actual, simulated or recorded feature of the real world. System 10 may utilize this input to train at least one part of system 10 to produce an autonomous driving policy, typically during an offline training mode (e.g., not during actual driving of ADM 1000), as explained herein.

In another example, system 10 may include at least one sensor 100, configured to obtain data corresponding with a physical condition in the real world, and produce a temporal data set representing the physical real-world condition. System 100 may utilize this temporal data during an online driving mode, to drive or control the operation of ADM 1000.

In yet another example, system 10 may receive combined input from at least one sensor 100 and at least one simulator module 400 in an operational work mode, to drive ADM 1000, as explained herein.

Input originating from the one or more input sources (e.g. sensors 100 and simulator 400) may include a data set 50' that may correspond with or include at least one feature of the real world. This feature may include, for example a condition of ADM 1000, a characteristic of ADM 1000, a condition of the road, and a characteristic of the road, as elaborated herein.

Sensors module 100 may include one or more sensors associated with ADM 1000. The one or more sensors may be configured to sample (e.g., repeatedly sample every preset period of time) physical data of the real world 50, and extract a temporal data set, including information associated with ADM 1000. This information may include, for example:
- a motion property (e.g., speed and direction) of ADM 1000;
- a physical property of ADM 1000 (e.g., engine revolutions or cycles per minute (RPM)); and
- environmental properties, such as proximity of ADM 1000 to other objects (e.g., cars, pedestrians, sidewalks, buildings, etc.), characteristics of a road (e.g., the road's width, curvature, length, etc.), and the like In respect to the above example, each sensor of sensor module 100 may be one of:
- an ADM configuration sensor, (e.g., a sensor of the steering wheel or steering system orientation, a sensor of the gas throttle level, etc.);
- an ADM condition sensor (e.g., an ADM velocity sensor, an engine cycle sensor, etc.); and
- an environmental sensor (e.g., a camera, a Light Detection and Ranging (LIDAR) sensor, a radar sensor and the like).

According to some embodiments, system 10 may include an abstraction module 200, that may be associated with at least one sensor 100, and may be configured to apply an abstraction on the temporal data 50 sampled by the at least one sensor 100. Abstraction module 200 may extract at least one feature of the sampled data, corresponding to a feature of the real world.

For example, at least one sensor may be an environmental sensor, adapted to providing a data set 50 including data of ADM 1000 environment (e.g., sensor 100 may be one or more cameras adapted to take images of the vicinity of ADM 1000). Abstraction module 200 may be associated with environmental sensor 100 and may extract specific features from environmental sensor 100 (e.g., recognize or categorize images to various objects, such as neighbouring cars and their respective movement vectors), and produce a temporal data set 50' including abstract information corresponding to features in the real world, including for example identity of the recognized object (e.g., car, pedestrian, tree, etc.) the recognized object's size, the object's location and movement properties, and the like.

In another example, abstraction module 200 may be associated with one or more ADM condition sensors (e.g., a Global Positioning System (GPS) signal, an accelerometer, an engine RPM meter, a speedometer and the like), to produce a data set 50' corresponding with a driving condition of the ADM (e.g., level of ascent or descent).

As shown in FIG. 2, system 10 may include at least one search tree (hereinafter 'tree') module, including one or more interconnected node objects 510, and at least one tree traversal module 600.

Figure 3:
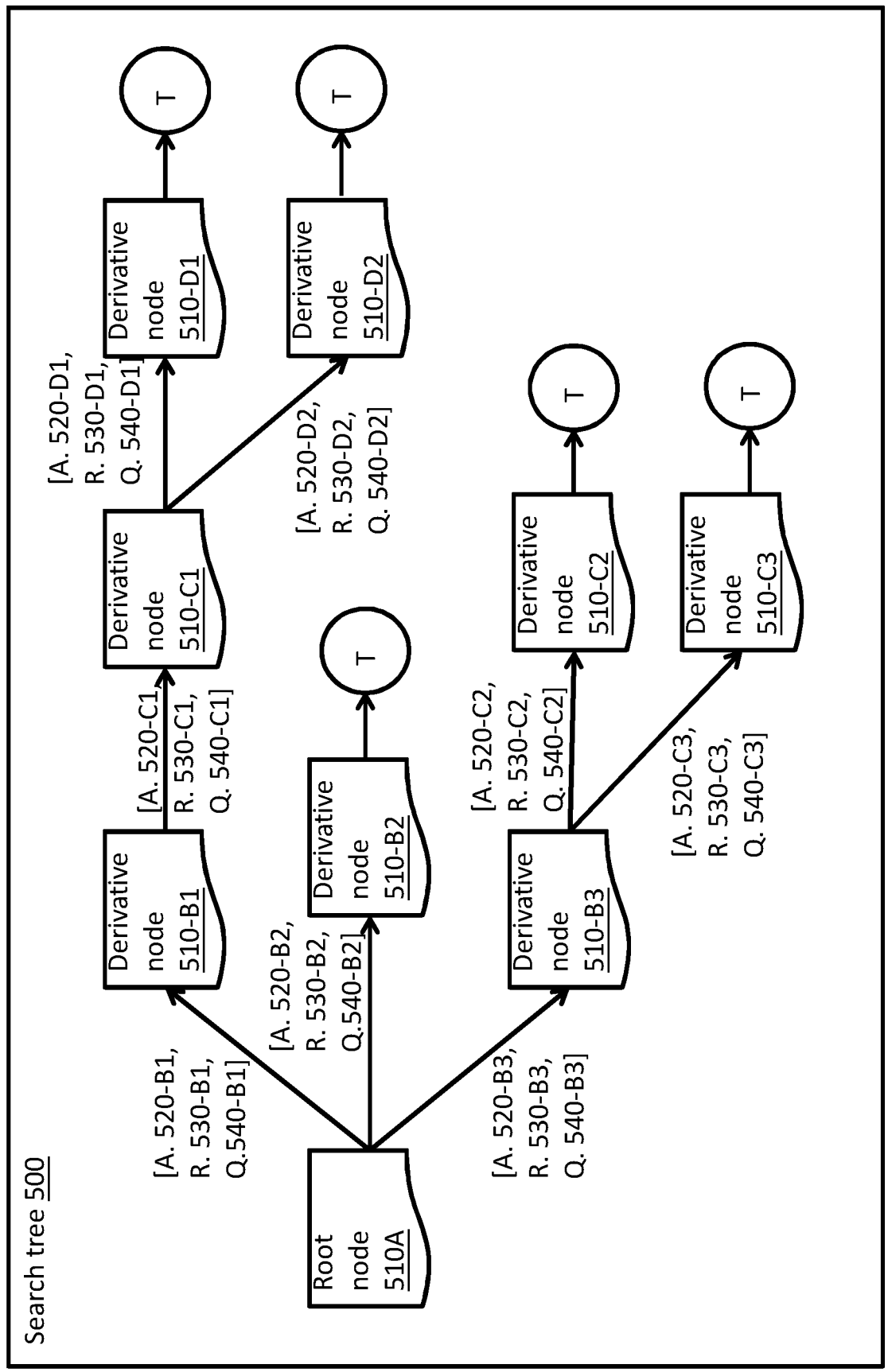
FIG. 3 is a schematic block diagram of a search tree, that may be included in a system for motion planning of an ADM, according to some embodiments.

Reference is now made to FIG. 3, which is a schematic block diagram of an example of a search tree 500 that may be included in system 10, according to some embodiments. Each node 510 of tree 500 may correspond with a condition or a state of ADM 1000 (e.g., speed of the ADM) and/or the ADM 1000 environment (e.g., proximity of ADM 1000 to an object such as a car, a curvature of the road, etc.). Node objects 510 may be implemented as, or may include a data structure (e.g., a data table) that may contain one or more data elements, and may be stored in a memory device (e.g., element 4 of FIG. 1). Nodes 510 of node tree 500 may be unidirectionally connected (e.g. by a reference or a pointer), where each connection may be associated with an action (marked as 'A.520' in FIG. 3), that may propagate a status or a condition of ADM 1000 from one node to another.

According to some embodiments, search tree 500 may facilitate a deep reinforcement learning algorithm, as known in the art, to produce a policy for motion planning of an ADM by interacting with at least one of simulator 400 and sensor too, as elaborated herein.

In some embodiments, node objects 510 may store data elements corresponding to a condition of ADM 1000 and or ADM 1000 environment, such as a motion property (e.g., velocity and direction) of ADM 1000, and tree 500 may represent possible transitions of ADM 1000 from one state or condition of ADM 1000 to another. For example, node 510-A may represent a condition of an ADM that may be driving at 30 kilometers per hour (KPH), and node 510-B1 may represent a condition of an ADM that may be driving at 40 KPH. Node 510-A may be connected to node 510-B1 by a link that may be associated with an action (marked 'A.520' in FIG. 3) such as increasing the pressure on ADM 1000 gas throttle or otherwise increasing engine speed or throttle level to accelerate.

It is to be noted that actions A.520 of the search tree may represent theoretical actions that may be applied on ADM 1000 at any given condition (e.g., node 510). Embodiments of system 10 may select at least one action A.520 that may be applied as at least one actual physical action (e.g., element 30 of FIG. 2) on elements of ADM 1000 (e.g., altering the steering system or turning the steering wheel), as explained herein. However, in the context of transition between different nodes of the search tree, as part of training system 10 to produce a policy for motion planning, theoretical actions A.520 are distinctly marked as separate elements from actual physical actions 30.

As shown in FIG. 3, each link between nodes 510 of the node tree may be further associated with a reward factor (marked as 'R.530' in FIG. 3) as known in the art of machine reinforcement learning. Embodiments of system 10 may be configured to select a trajectory or a path including one or more linked nodes 510 (e.g.: 510A→510-B1→510-C1→510-D2), as part of a reinforcement learning algorithm according to one or more reward factors, as explained herein.

As known in the art, tree 500 may be spawned from a first, root node 510A, and may be expanded by iteratively producing one or more interconnected second node. The first and second nodes may be linked or associated via a respective reward factor R.530 and action A.520. The one or more second, (expanded' or 'derivative', as commonly referred to in the art) node may correspond with a predicted state or condition of ADM 1000 and or the ADM's environment, following application of the action A.520, and the reward factor may be a numerical value that may represent a level of success that may be manifested by the transition of ADM 1000 between the first and second states or conditions.

For example, a first state of a precarious driving condition of ADM 1000 (e.g., "tailgating" in close proximity to an adjacent vehicle) may be represented by a first node, and a second state of a safe condition (e.g., where a safe distance is kept) may be represented by a second node. ADM 1000 may transit from the first node to the second node via action A.520 (e.g., lowering the throttle or engine speed, or releasing the gas pedal, to slow down), and may be rewarded by a positive reward factor R.530.

In some embodiments, the expansion or derivation of the one or more second nodes, and the attribution of a reward factor R.530 to the link or transition between the first and at least one second node may be performed by a simulator module 400, as elaborated herein.

As known in the art of reinforcement learning, each combination of a node 510 and an action 520 of search tree 500 may be associated with a quality factor or value (marked as 'Q. 540' in FIG. 3). In some embodiments, the quality value may present the best sum of rewards, when traversing through one or more trajectories that originate from a specific node. For example, Quality value Q.540-C1, which is associated with node 510-B1 and action A.520-C1 (i.e., the transition to node 510-C1), may be, or may represent the maximal value between the summed rewards (R. 530-C1 +R.530-D1) and the summed rewards (R. 530-C1 +R.530-D2).

According to some embodiments, simulator 400 may be implemented as a software process, and may be executed by a controller (e.g., element 2 of FIG. 1). Simulator 400 may include one or more rules or definitions, facilitating a prediction of a future state or condition (e.g., after an elapse of a predefined short period) of ADM 1000, given a present state and an applied action. Simulator 400 may further include one or more rules or definitions, associating a reward value R.530 to a predicted state or condition.

For example, simulator 400 may include a rule or a definition predicting the speed of ADM 1000 in the future (e.g., in 5 seconds), given the current speed (e.g., 30 KPH) and an applied action (e.g., brake applied, or brake pedal pressed by 50%). Simulator 400 may further include a rule or definition, associating the predicted speed with a numerical reward (e.g., a high reward for driving under the speed limit, and a low reward when surpassing the speed limit).

In another example, simulator 400 may include a rule or a definition predicting the location and orientation of ADM 1000 in the future, given the current orientation, position and speed, and given an applied action (e.g., turning the steering wheel by 5 degrees to the left side). Simulator 400 may further include a rule or a definition, associating the predicted location with a numerical reward (e.g., a high reward for driving at the middle of a traffic lane, and a low reward when driving at the lane's edge, or close to another object).

In some embodiments, simulator 400 may receive a first node 510, corresponding with a state or condition of ADM 1000 and predict one or more future conditions of ADM 1000 following application of respective one or more actions A.520. Simulator 400 may produce one or more derivative or expanded node objects 510, corresponding to the predicted one or more conditions of ADM 1000, and link or associate the first node 510 with the one or more derivative or expanded node objects 510. Simulator 400 may further be configured to attribute a reward value R.530 to each transition or link between the first node and the one or more derivative nodes.

In some embodiments, simulator 400 may include a neural network (NN) 410, configured to receive a current condition or state of ADM 1000, and at least one applied action, and predict a future condition or state of ADM 1000, as known in the art.

For example, NN 410 may receive one or more data elements corresponding with:

characteristics of ADM 1000, including for example: dynamic steering properties, weight, size, etc.

current motion properties (e.g., speed and direction) of ADM 1000;

current physical properties (e.g., engine cycle RPM) of ADM 1000;

characteristics of a road, including for example: the road's width, curvature, length, etc.; and conditions of the road, including for example: existence of objects on the road (e.g., cars, pedestrians, sidewalks, etc.), proximity of ADM 1000 to such objects, whether the road is dry or wet, etc.

NN 410 may receive one or more data elements corresponding with an action that may be applied on ADM 1000 (e.g., turning the steering wheel), and may be trained to predict a future condition or state (e.g., speed and orientation) of ADM 1000 following application of the action.

According to some embodiments, system 10 may include an artificial neural network (NN) module 300, adapted to produce a policy for motion planning of an ADM. As known in the art, NN 300 may operate at one of at least two stages, e.g. an initial training stage and an operational stage.

During the training stage, NN 300 may be configured to cooperate with simulator 400 and search tree 500 in an iterative manner, as explained herein.

NN 300 may receive, as an input from simulator 400, a data set (e.g., element 50' of FIG. 2) corresponding with at least a condition of ADM 1000. Data set 50' may correspond with a first, root node (e.g., 510A of FIG. 3) of search tree 500.

NN 300 may produce at least two initial quality factor values (e.g. Q.540-B1 and Q.540-B3 of FIG. 3), that may be associated with the first node 510A, and with an action (e.g. A.520-B1 and A.520-B3 of FIG. 3) that may be applied therefrom.

NN 300 may produce the at least two initial quality factor value (e.g. Q.540-B1) as an expansion heuristic for tree 500, that may be utilized by system 10 to select at least one action A.520 to expand the first node 510A.

In some embodiments, the initial quality factor (e.g. Q.540-B1) may be set to a predefined value, and may be updated during the training of NN 300, as known in the art.

Simulator 400 may receive the selected action (e.g. A.520-B1) from NN 300 and may expand or add to search tree 500 by producing and adding at least one associated second node (e.g., 510-B1). The second node may correspond with a predicted state of ADM 1000 after applying associated action 520-B1. Search tree 530 may associate the first and second nodes via action 520-B1, reward value 530-B1 and quality factor 540-B1, as depicted in FIG. 3.

The iterative or repetitive process described above of action selection by NN 300 and expansion of tree 500 may continue until a predefined termination condition is met (e.g., marked as 'T' states in FIG. 3). The termination condition may include, for example: an unacceptable condition of ADM 1000 (e.g. an accident). duration of elapsed time since the creation of the root state, exhaustion of computational resources, and the like.

When the termination condition is met, a controller (e.g. element 2 of FIG. 1) may back-propagate along each trajectory or route of the expanded tree and may update the values of quality factors attributed to each node and actions, as known in the art of reinforcement learning.

According to some embodiments, the quality factor value may be updated according to the Bellman equation, as known in the art (and as elaborated below). According to alternate embodiments, the updated quality factor value may be a maximal value of summed rewards along a specific trajectory. For example, updated quality value Q.540-B1, which is associated with root node 510-A and action A.520-B1 (i.e., the transition to node 510-B1), may be assigned the value of summed rewards (R. 530-B1+R.530-C1+R.530-D2).

NN 300 may receive at least one updated quality factor value Q.540 as feedback for training and may fine-tune the selection of actions A.520 in face of a future-received data set 50', as known in the art of deep machine reinforcement learning.

According to some embodiments, during the operational stage (e.g., during autonomous driving, after the training stage), system 10 may utilize NN 300 to directly operate or conduct ADM 1000. In such embodiments, NN 300 may be configured to:

receive, as an input, a data set 50' corresponding with at least a condition of ADM 1000, from at least one of sensors 100 (e.g., an abstraction of a real-world feature, as explained above);

produce an optimal quality factor Q.540 according to the received data set 50 and according to the training of the NN; and select an action A.520 that may be associated with the produced optimal quality factor Q.540, and may be applied as an action (e.g., element 30 of FIG. 2) on at least one element of ADM 1000.

According to some embodiments, system 10 may be configured to receive from at least one data input source (e.g., sensors 100 and/or simulator 400) a data set 50', corresponding with at least one of a condition of ADM 1000, including for example a motion property of ADM 1000, a physical property of ADM 1000 (e.g., engine cycle RPM), environmental properties (e.g., proximity of ADM 1000 to other objects) and the like.

System 10 may further receive (e.g., from input device 7 of FIG. 1) a set of predefined selectable actions 40, that may be applicable on ADM 1000 (e.g., pressing the brakes pedal, steering the wheel, etc.).

At least one processor (e.g., element 2 of FIG. 1) may create a first node object (e.g., element 510A of FIG. 3), including, or corresponding with received data set 50'. For example, the node may be implemented as a data object, including a structure, or a table maintaining received data set 50, and may be stored on a memory device (e.g., element 4 and/or element 6 of FIG. 1). The first node may serve as a root, and may be expanded, as commonly referred to in the art, to form a search tree (e.g., element 500 of FIG. 2).

A simulator (e.g., element 400 of FIG. 2) may produce search tree 500, to include a root node (e.g., element 510A of FIG. 3) and plurality of derivative nodes 510, linked to root node 510A. Root node 510A may represent a current condition of ADM 1000 and/or the ADM's environment, and each derivative node may represent a predicted condition of the ADM, following application of an action A.520 on ADM 1000. As shown in FIG. 3, nodes 510 may be interlinked by the actions and associated quality factors.

Simulator 400 may receive data set 50' associated with the first node 510A and the set of applicable actions 40, and may expand the first node and create derivative nodes (e.g., elements 510-B1, 510-B2 and 510-B3 of FIG. 3), where each of the derivative nodes represents, or simulates a status or condition of ADM 1000 following a respective action (e.g., elements A.520-B1, A.520-B2 and A.520-B3 of FIG. 3).

Simulator 400 may further attribute a reward value to each transition from root node 510A to a derivative node (e.g., elements R.510-B1, R.510-B2 and R.510-B3 of FIG. 3), according to predefined criteria.

For example, simulator 400 may attribute a high reward value (e.g., R.530-B1) to a transition to a first node (e.g., 510-B1), corresponding with a condition in which ADM 1000 is driving safely, at the middle of a traffic lane, and a low reward value (e.g., R.530-B2) to a transition to a second node (e.g., 510-B2), corresponding with a condition in which ADM 1000 is precariously driving on the road shoulders.

A neural network (e.g., Q-network 300 of FIG. 2) may receive data set 50' associated with the first node 510A and one or more actions (e.g., A.520-B1) of the applicable actions' set 40, and associate or attribute an initial quality value (e.g., Q.540-B1, Q.540-B2 and Q.540-B3) to each action (e.g., A.520-B1, A.520-B2 and A.520-B3).

In some embodiments, the initial quality values may be equal to the respective reward values (e.g., respectively equal to R.530-B1, R.530-B2 and R.530-B3) assigned by simulator 400. In some embodiments, the initial quality values may be predefined values and/or uninitialized, random values (e.g., 'garbage' values, as referred to in the art).

Neural network 300 may be trained to select at least one action according to at least one of: the received data set and the at least one updated quality factor. For example, NN 300 may select one or more quality factors (e.g., Q.540-B3), as known in the art of reinforcement learning. The one or more quality factors may be associated with the first node (e.g., 510A) and with respective one or more actions (e.g., A.520-B3) of the predefined applicable actions set 40.

In some embodiments, NN 300 may select the top-valued quality factors (e.g., the maximal quality factor, a predefined number ('N') of top-valued quality factors, all quality factors that surpass a predefined threshold and the like). As the quality factors (e.g., Q.540-B3) are associated with respective actions (e.g., A.520-B1), selection of one or more quality factors by NN 300 may therefore be equivalent to selection of respective one or more actions.

For example, NN 300 may include an output layer, where each output is associated with one action of the selectable actions set 40, and with a respective quality factor value Q.540. Selection of a top valued quality factor Q.540 may thus intrinsically include selection of an associated applicable action A.520.

Simulator 400 may receive the selection of one or more quality factors (e.g., Q.540-B3), that is equivalent to the respective selection of action A.520-B3) as an expansion heuristic, as referred to in the art, to further expand search tree 500.

For example, simulator 400 may receive one or more selected actions (e.g., A.520-B3), as a heuristic to expand a respective node (e.g., 510-B3), e.g. by adding a new node, according to the NN 300 selection. Simulator 400 may predict one or more conditions of ADM 1000 following application of the selected one or more actions (e.g., A.520-B3), and subsequent actions (e.g., A.520-C2 and A.520-C3). Simulator 400 may produce one or more nodes (e.g., 510-C2, 510-C3) and respective one or more reward factors (e.g., R.510-C2, R.510-C3), corresponding with the predicted conditions of ADM 1000, in a similar manner as elaborated above. The one or more produced nodes (e.g., 510-C2, 510-C3) may be associated with the node (e.g., 510-B3) of the selected action (e.g., 520-B3) by the respective actions (e.g. A.520-C2, A.520-C3) and reward factors (e.g., R.530-C2 and R.530-C3).

The expansion of the search tree as elaborated above, namely (a) selection of one or more quality factors (associated with respective actions) by NN 300, (b) prediction of future conditions according to the applicable actions set 40, and (c) production of corresponding nodes 510 in search tree 500 may continue, repeat or iterate, until at least one termination condition (T) is reached. Terminating condition T may include, for example: exhaustion of computing resources, elapse of time, arrival at an unacceptable condition of ADM 1000 (e.g., an accident), and the like.

When termination condition T is reached, tree traversal module 600 may execute a back-propagating algorithm and may update a value of at least one quality factor 540 by computing optimal sums of rewards along one or more trajectories in the expanded search tree.

For example, the value of quality factor Q.540-B3 may be updated to the maximal sum of rewards for all the tree trajectories (e.g., a first trajectory leading to node 510-C2 and a second trajectory leading to node 510-C3) stemming from Q.540-B3. In this example, the value of quality factor Q.540-B3 may be updated according to the Equation 1:

$$Q.540\text{-}B3 = \text{Max} ((R.530\text{-}B3 + R.530\text{-}C2), (R.530\text{-}B3 + R.530\text{-}C3)) \quad \text{Equation 1}$$

In some embodiments, at least one quality factor may be updated by backward-propagating along one or more trajectories of the expanded tree, and accumulating optimal rewards according to Bellman's equation, as known in the art, and shown in Equation 2 (below), where:

$Q(S_n, A_m)$ is the current value of a quality factor associated with a node $S_n$ and an action $A_m$;

$Q^{updated}(S_n, A_m)$ is the updated value of the quality factor associated with a node $S_n$ and an action $A_m$;

$\gamma$ is commonly referred to in the art as a discount factor and is adapted to determine the importance of future rewards. It is commonly assigned a value between 0 and 1;

$R_{n \rightarrow n+1} (A_n)$ is a reward factor value, in the transition between a first node 'n' and a derivative node 'n+1'; following an action $A_m$ and $\max_A Q (S_{n+1}, A)$ is the maximal quality factor value among all derivative nodes $Sn_{+1}$.

$$Q^{updated}(S_n, A_m) = R_{n \rightarrow n+1}(A_m) + \gamma(\max_A Q(S_{n+1}, A)) \quad \text{Equation 2}$$

According to some embodiments, search tree 500 may be expanded by a global, deterministic tree traversal algorithm. For example, NN 300 may relate globally (e.g., without distinction) to all nodes 510 of tree 500, and deterministically (e.g., in a manner that is repeatable and not probabilistic) select a plurality of quality factor values Q.540 that may exceed a predefined threshold. In such embodiments, simulator 400 may receive the plurality of quality factors Q.540 from NN 300 and may relate may relate to them as an expansion heuristic or expansion decision, to select or determine one or more actions A.520 of applicable actions set 40, and expand tree 500 accordingly.

For example, simulator 400 may receive a first node 510, corresponding with a current condition of ADM 1000, and receive a plurality of selected quality factors Q.540 (and hence associated plurality of actions A.520) from NN 300. Simulator 400 may then produce a plurality of predictions of the condition of ADM 1000, following application of the actions of actions' set 40 (e.g., turn the steering wheel by 5 degrees, 10 degrees, 15 degrees, etc.), include or associate the predicted conditions with a respective plurality of derivative nodes 510, and attribute a reward value R.530 to each transition or link between the first node 510 and each of the derivative nodes 510.

According to some embodiments, search tree 500 may be expanded by a local, probabilistic tree traversal algorithm, to promote the exploration (in contrast to exploitation) of node tree 500, as known in the art. For example, NN 300 may be configured to randomly select one or more quality factors Q.540 associated with a randomly selected on or more respective nodes 510, and simulator may expand tree 500 according to the probabilistically (e.g., randomly) selected quality factors Q.540.

traversal module 600 may update at least one quality factor value by accumulating the rewards along nodes of the trajectory of the expanded tree. For example, NN 300 may select to expand tree 500 probabilistically, to include only one trajectory, (e.g. the trajectory including nodes 510A, 510-B1, 510-C1 and 510-D2 of FIG. 3). In this configuration, tree traversal module 600 may update quality factor Q.540-B1 according to the subsequent quality and reward values along that trajectory.

In another example, NN 300 may select to expand tree 500 by a deterministic, global algorithm (e.g., to include all branches of FIG. 3). Tree traversal module 600 may apply a deterministic tree traversal algorithm, including for example an A-star (A*) tree-search algorithm and an epsilon-greedy tree-search algorithm, as known in the art, and update all quality factor values of nodes 510 of tree 500 according to the subsequent quality Q.540 and reward values R.530 along each trajectory.

Neural network 300 may receive at least one updated quality factor Q.540 as feedback. Neural network 300 may be trained to select at least one quality factor Q.540 and an associated action A.520 of the root node, according to at least one of: received data set 50' and the at least one updated quality factor.

For example, NN 300 may be trained during a training mode or stage according to the current condition of the ADM and the updated one or more quality factors, so that in an operational stage or mode (e.g., when driving the ADM) the NN would select an optimal action (e.g., associated with a top-valued quality factor), according to the current condition of the ADM (e.g., as reflected in data set 50'). During such operational mode, system 10 may apply the selected optimal action A.520 on at least one physical element of the ADM (e.g., a steering mechanism), to automatically conduct ADM 1000.

According to some embodiments, after selecting an action (e.g., A.520-B3) of root node 510A by NN 300, the condition of the ADM 1000 may be reflected by the respective derivative node (e.g., 510-B3). Simulator 400 may modify search tree 500, so that the derivative node representing the current condition of ADM 1000 will become the root node, and the expansion process may resume from that new root node.

Referring back to FIG. 2, according to some embodiments, abstraction module 200 may include a mapper module 210, configured to receive (e.g., via abstraction module) an abstraction of at least one real-world feature and produce a map (e.g., a map of a portion of a road upon which ADM 1000 is driving) describing the relation of ADM 1000 to the real world (e.g., in relation to the road and other objects included therein). For example, a map may be implemented as a data structure (e.g., a table that may be stored at storage 6 of FIG. 1) that may include: a location of ADM 1000, ADM 1000 speed and orientation, the location of road shoulders in relation to ADM 1000, location of other objects (e.g., vehicles, pedestrians, etc.) in relation to ADM 1000 and the like.

Figure 4:
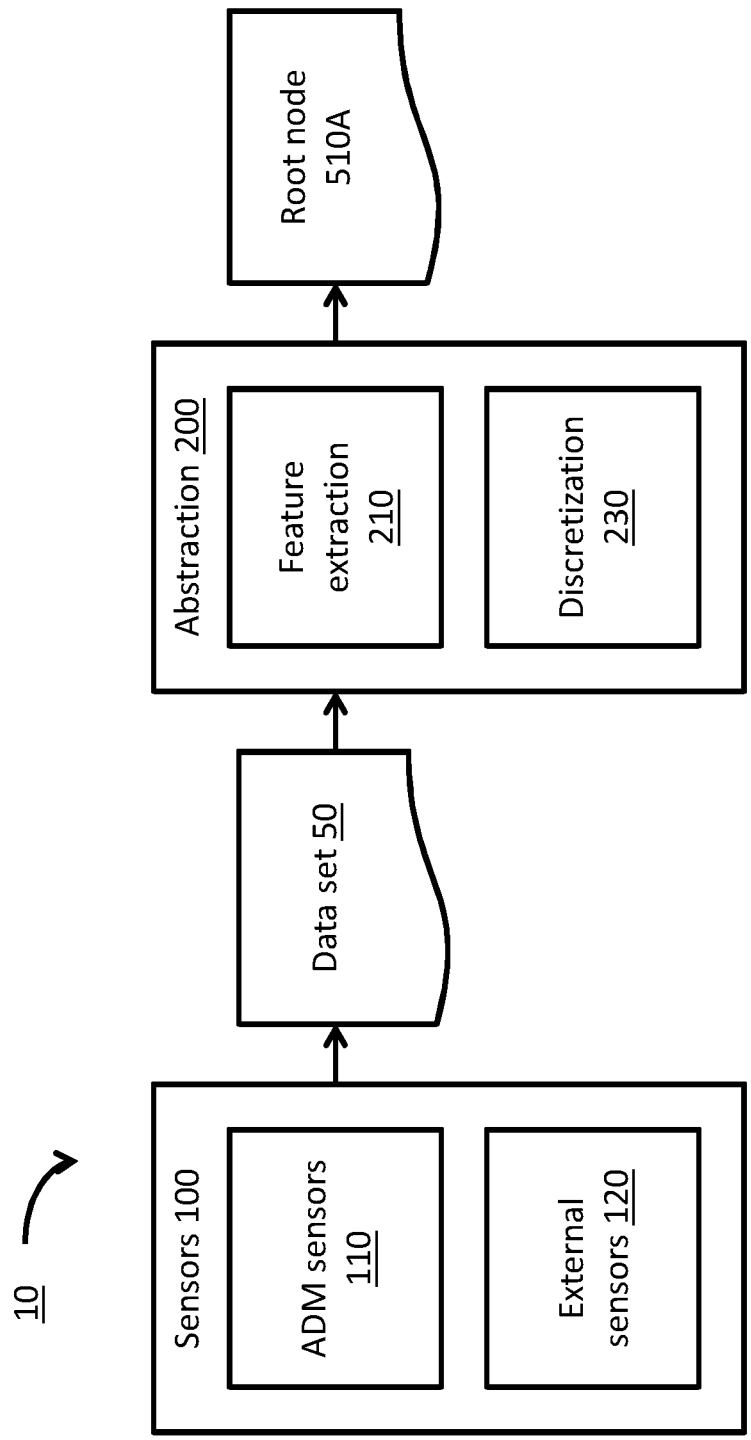
FIG. 4 is a block diagram, depicting a process of creation of a root node object for driving by a system for motion planning of an ADM, according to some embodiments.

Reference is now made to FIG. 4, which is a block diagram, depicting a process of creation of a root node object 510A for driving by system 10 during an operational driving stage, according to some embodiments. As shown in FIG. 4, at least one sensor 100 may produce a data set 50, corresponding with a condition of ADM 1000 and/or an environment of ADM 1000, and system 10 may create root node object 510A based on data set 50.

The at least one sensor 100 may include one or more ADM sensors 110 adapted to obtain data relating to, for example, at least one of:

a motion property (e.g., speed and direction) of ADM 1000;

a physical property of ADM 1000 (e.g., engine cycle rounds per minute (RPM)); and a configuration of ADM 1000 (e.g., orientation of the steering wheel).

The at least one sensor 100 may further include one or more external sensors 120, configured to provide data relating to environmental properties, such as proximity of ADM 1000 to other objects (e.g., cars, pedestrians, sidewalks, buildings, etc.), characteristics of a road (e.g., the road's width, curvature, length, etc.), and the like. For example, external sensors 120 may be a camera, a Light Detection and Ranging (LIDAR) sensor, a radar sensor and the like.

Abstraction module 200 may be configured to receive data sampled by the at least one sensor 100, apply abstraction on the sampled data, and optionally extracting at least one feature 210 of the sampled data, corresponding to a feature of the real world, as discussed above, in relation to FIG. 1.

In some embodiments, abstraction module 200 may further include a discretization module 230, adapted to discretize at least one data sampled by the one or more sensors 100. For example, an ADM sensor 110 may sample data relating to configuration of ADM 1000 (e.g., orientation, in degrees, of a steering wheel or steering mechanism), and discretization module 230 may be adapted to discretize the sampled data to predefined quantities (e.g., in quantities of 5 degrees, as in: [−9° to −5°], [−4° to 0], [0° to 4°], [5° to 9°], etc.).

A processor (e.g. element 2 of FIG. 1) of system 10 may be configured to produce a node object 510A, corresponding with data set 50 of the at least one sensor 100. When system 10 is in an operational stage (e.g., when driving ADM 1000), produced node 510A may be a root node of a search tree (e.g., element 500 of FIG. 3).

Figure 5:
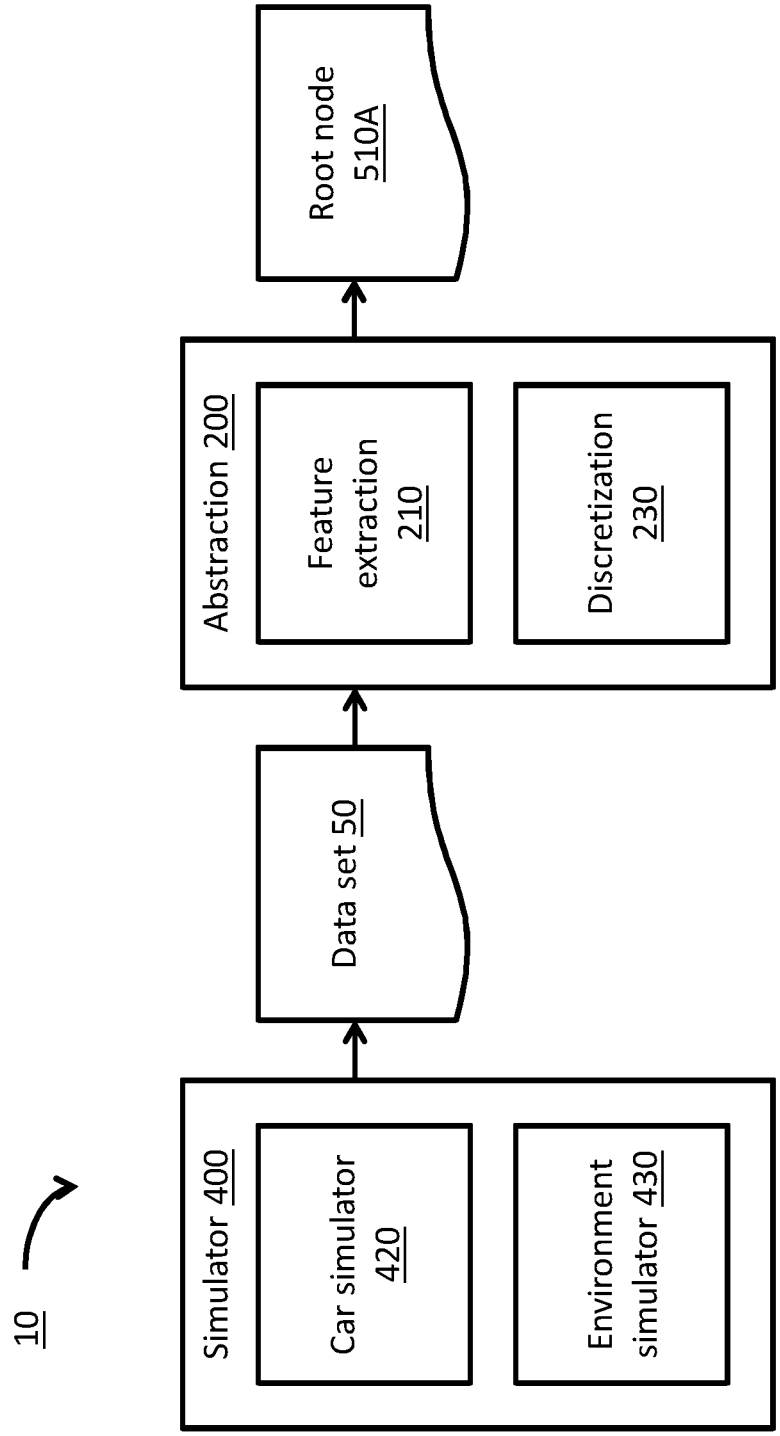
FIG. 5 is a block diagram, depicting a process of creation of root node objects during a training stage by a system for motion planning of an ADM, according to some embodiments.

Reference is now made to FIG. 5, which is a block diagram, depicting a process of creation of root node objects 510A during a training stage by system 10, according to some embodiments.

As shown in FIG. 5, simulator 400 may produce a data set 50, corresponding with a simulated condition of ADM 1000 and/or an environment of ADM 1000, and system 10 may create root node object 510A based on the at least one sensor's 100 data set.

According to some embodiments, simulator 400 may include a car simulator module 420, configured to produce a plurality of properties associated with a condition of a real-world ADM. For example, car simulator module 420 may be configured to produce a plurality of motion properties (e.g., speed, orientation, gear selection etc.) associated with a predefined driving scenario (e.g., in a hilly track, in mid-town traffic, etc.).

According to some embodiments, simulator 400 may include an environment simulator module 430, configured to produce a plurality of environmental properties, representing conditions that may exist in a real-world environment. For example, environment simulator module 430 may produce properties of a road, including for example, the road's width, steepness, wetness, side-winds, existence of additional objects on the road such as cars, pedestrians and obstacles, motion properties of these additional objects and the like.

As shown in FIG. 5, system 10 may include an abstraction module 200, configured to apply at least one of abstraction, discretization 230 and feature extraction 210 on data set 50 produced by simulator 400, in a similar manner to that discussed above, in relation to FIG. 4.

A processor (e.g. element 2 of FIG. 1) of system 10 may be configured to produce a node object 510A, corresponding with data set 50 received from simulator 400 and/or abstraction module 200. When system 10 is in the training stage, produced node 510A may be a root node of a search tree (e.g., element 500 of FIG. 3).

Figure 6:
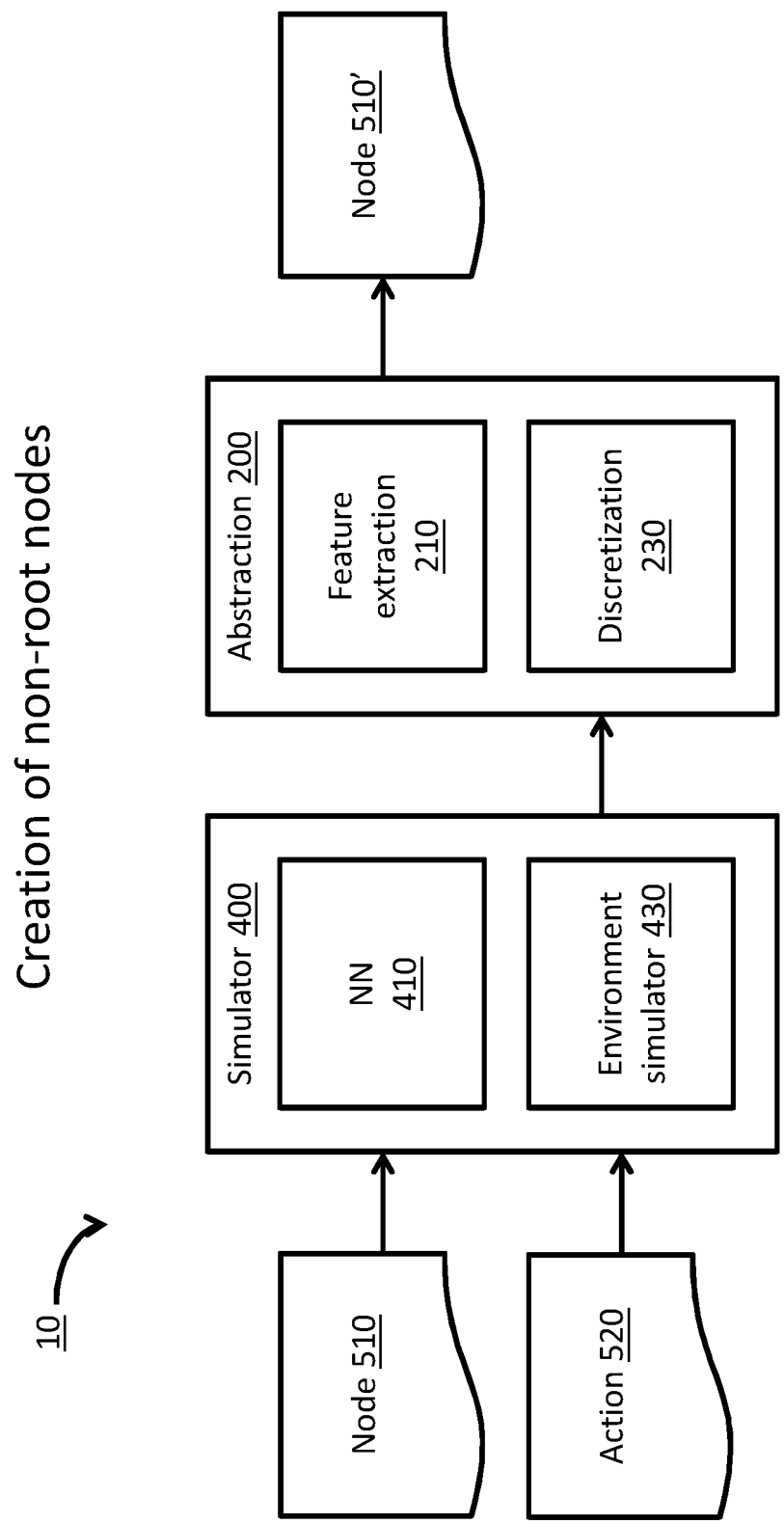
FIG. 6 is a block diagram, depicting a process of creation of non-root node objects by a system for motion planning of an ADM, according to some embodiments.

Reference is now made to FIG. 6, which is a block diagram, depicting creation of non-root node objects 510' by system 10, according to some embodiments. The process depicted in FIG. 6 may be applicable for creation of a non-root node 510', when system 10 is either at the training stage or at the operational stage.

As shown in FIG. 6, simulator 400 may receive a first node object 510, corresponding with a first condition of an ADM, including for example, motion properties (e.g., speed and orientation) of ADM 1000, environmental conditions of ADM 1000 (e.g., location on the road, location of other objects on the road, etc.) and the like.

Simulator 400 may further receive an action 520, that may be applied on ADM 1000 (e.g., applying pressure on an accelerator paddle), and predict (e.g., by NN 410) a future condition of ADM 1000, as explained above in relation to FIG. 2.

Simulator 400 may forward the predicted condition to abstraction module 200, configured to apply at least one of abstraction, discretization 230 and feature extraction 210 on the data of simulator 400, in a similar manner to that discussed above, in relation to FIGS. 4 and 5.

A processor (e.g. element 2 of FIG. 1) of system 10 may be configured to produce a predicted node object 510', corresponding with the data of the predicted condition of ADM 1000, received from the simulator 400 and/or abstraction module 200.

The creation of derivative node object 510' may be applicable when system 10 is in the training stage, to facilitate efficient training of NN 300 to produce a policy for motion planning of an ADM.

Creation of derivative node object 510' may also be applicable when system 10 is in the operational stage (e.g., during driving of ADM 1000), facilitating selection of optimal actions, and intelligently traversing between nodes of search tree 500, as elaborated herein.

Figure 7:
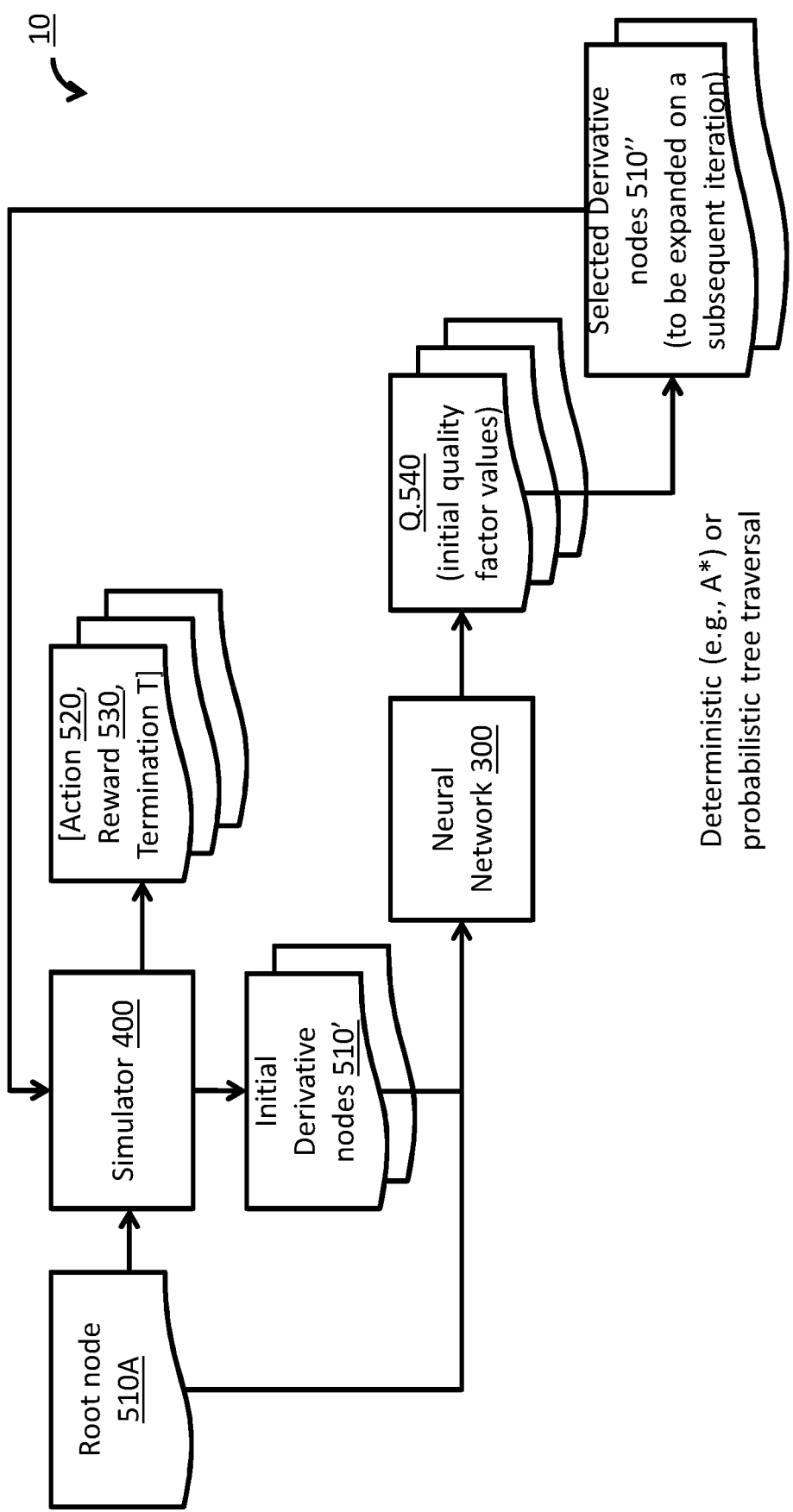
FIG. 7 is a block diagram, depicting a process of selection of one or more derivative node objects for expansion by a system for motion planning of an ADM, according to some embodiments.

Reference is now made to FIG. 7, which is a block diagram, depicting selection of one or more derivative node objects 510' for expansion by system 10, according to some embodiments.

As elaborated above, search tree (e.g., element 500 of FIG. 2) may initially include a root node object 510A, corresponding with a condition of ADM 1000 and/or ADM 1000 environment.

Simulator 400 may receive root node object 510A and may expand root node object 510A, as referred to in the art, by predicting a plurality of future conditions following application of one or more actions of the applicable actions' set (e.g., element 40 of FIG. 2), resulting in an initial set of derivative nodes 510', as discussed above in relation to FIG. 2 and FIG. 3.

According to some embodiments, neural network 300 may be configured to produce an initial selection of two or more quality factors 540, associated with respective combinations of derivative nodes 510' and actions. For example, as elaborated above in relation to FIG. 2, neural network 300 may select two or more quality factors that may have the highest value among quality factors associated with node 510A.

For example, NN 300 may select quality factors Q.540-B2 and Q.540-B3, associated with a transition between root node 510A and respective derivative nodes 510-B2 and 510-B3, and respective actions A.520-B2, A.520-B3 of the predefined applicable actions set 40. The selection of initial quality factors Q.540 may serve as a heuristic, to select one or more derivative nodes 510'' for expansion (e.g., by simulator 400) in a subsequent expansion iteration (e.g., until a termination condition is met).

Figure 8:
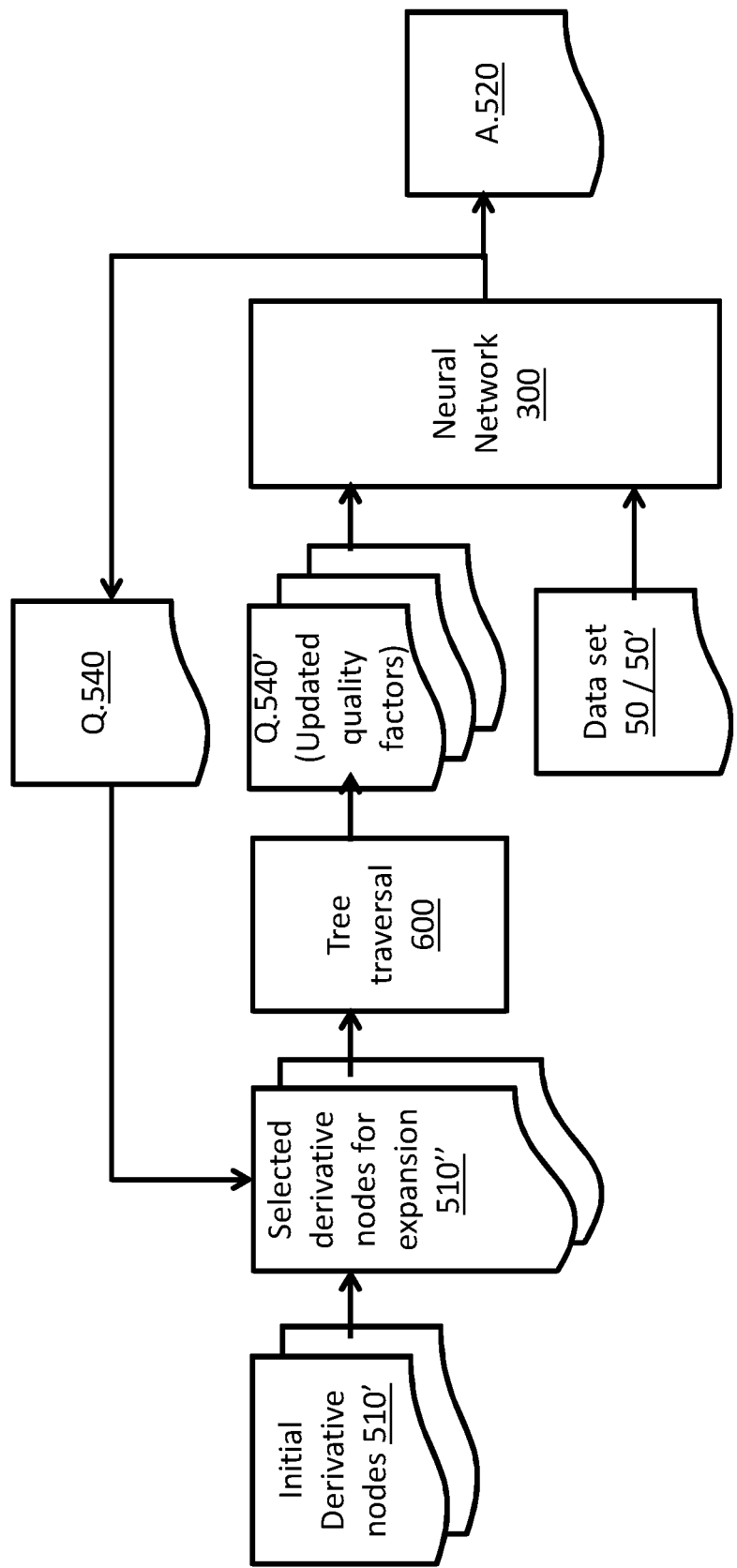
FIG. 8 is a block diagram, depicting training of a neural network by at least one corrected quality factor value, to produce a policy of motion planning of an autonomous driving machine according to some embodiments.

Reference is now made to FIG. 8, which is a block diagram, depicting training of NN 300 by at least one corrected quality factor value, to produce a policy of motion planning of an autonomous driving machine according to some embodiments.

NN 300 may receive data set 50/50', including data corresponding to a condition of ADM 1000 and/or the environment of ADM 1000, originating from at least one input source (e.g., element 100 of FIG. 2). The data set may be received directly from input source 100, marked as element 50 in FIG. 8, or via an abstraction module (e.g., element 200 of FIG. 2), marked as element 50' in FIG. 8.

As elaborated above in relation to FIG. 7, simulator 400 may have expanded a root node (e.g., 510A of FIG. 3), to produce a plurality of initial derivative nodes 510'.

NN 300 may select one or more quality factor values Q.540 associated with:

an initial node 510' in search tree 500, corresponding with the condition of ADM 1000 and/or the environment of ADM 1000; and an action (e.g., A.520 of FIG. 3) applicable therefrom.

The selection of quality factor values Q.540 may serve as a heuristic for selecting derivative nodes 510'' for expansion on search tree 500.

When a termination condition is met, the expansion of tree 500 may be halted, and tree traversal module 600 may calculate a value of one or more updated quality factors 540' on search tree 500.

NN 300 may receive the one or more updated quality factors Q.540' as feedback to train on optimally selecting a quality factor, and hence an associated action A.520, when presented with a future data set (50/50') corresponding with a condition of an ADM.

Figure 9:
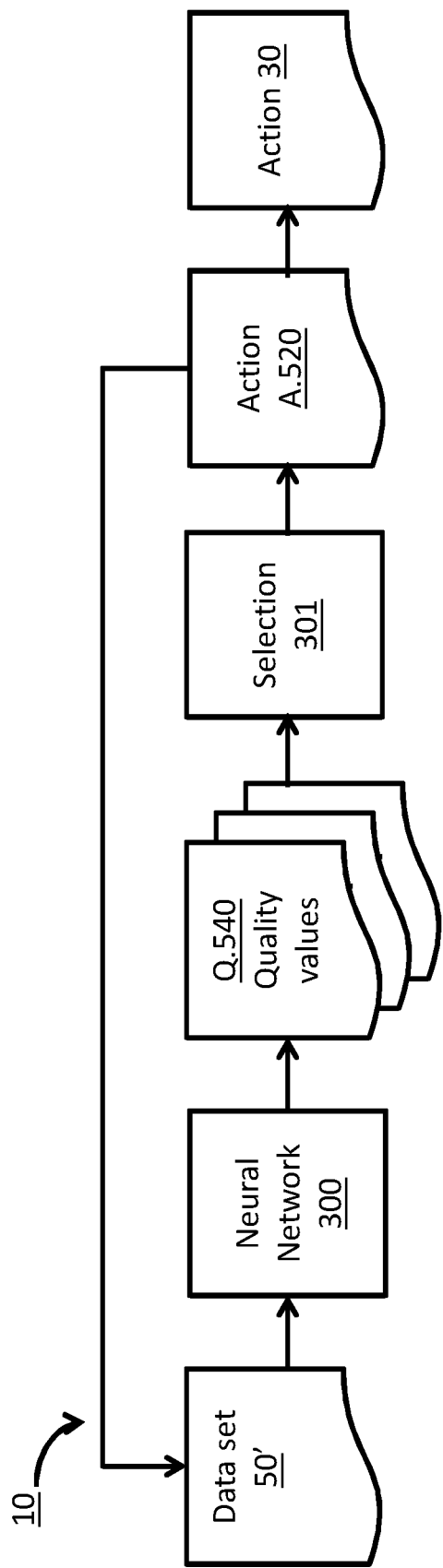
FIG. 9 is a block diagram, depicting an operational (e.g., driving) mode of a system for motion planning of an ADM, according to some embodiments.

Reference is now made to FIG. 9, which is a block diagram, depicting an operational (e.g., driving) mode or stage of system 10 for producing a policy of motion planning of an ADM, according to some embodiments.

As explained above in relation to FIG. 8, during an initial training stage, NN 300 may be trained according to at least one of the received data set 50' and the at least one updated quality factor to select at least one action of an actions' set 40, that may be applied to at least one element of ADM 1000. During the operational stage (e.g., in an autonomous driving mode), system 10 may conduct ADM 1000 according to the training of NN 300, as elaborated below.

System 10 may receive at least one temporal data set 50', corresponding with a condition of ADM 1000 and/or an environment of ADM 1000. Abstraction module 200 may abstract the data and may extract one or more features corresponding to features of the real world, as elaborated above.

NN 300 may receive data set 50', and may produce two or more quality factor values, according to the NN 300 training In some embodiments, NN 300 may include an output layer, where each output may be associated with one action of the selectable actions' set (e.g. element 40 of FIG. 2), and with a respective quality factor value (e.g. Q.540 of FIG. 3). Selection of a quality factor Q.540 may thus intrinsically include selection of an associated applicable action A.520 of selectable actions' set 40.

NN 300 may include a selection module 301, adapted to select one quality value (e.g., by a maximal value selection), and hence an action, A.520. System 10 may be configured to applying the selected action A.520 as at least one real-world action 30 on at least one element of ADM 1000. An element may be for example a control, a device or a system, e.g. a steering system or steering wheel, a throttle or engine speed control, a gear shift or gear change system, a braking device etc.

System 10 may continuously or repetitively receive temporal data sets and produce a selection of actions as elaborated herein in relation to FIG. 9, to continuously conduct the ADM in response to the received data sets.

Figure 10A:
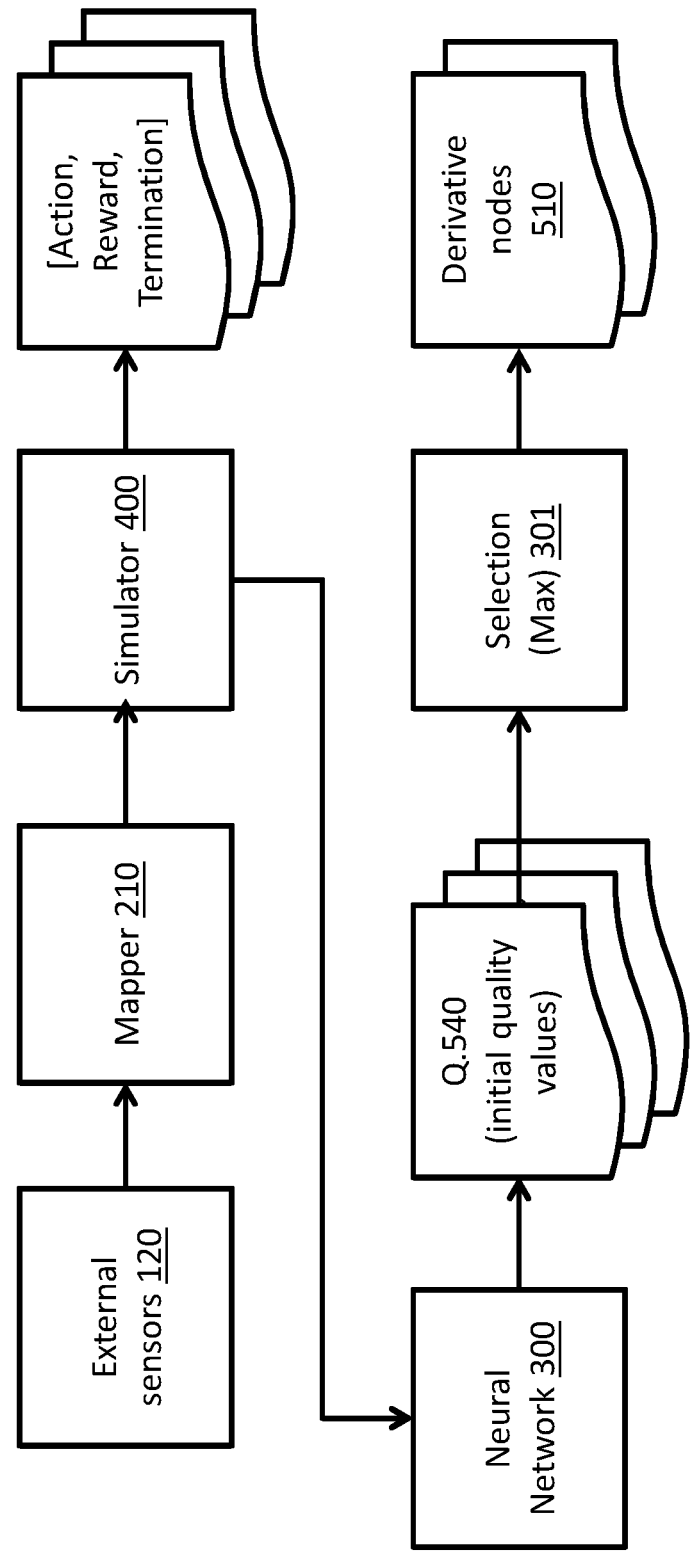
FIGS. 10A and 10B jointly depict a block diagram, depicting an operational (e.g., driving) mode of a system for motion planning of an ADM, according to some embodiments.
Figure 10B:
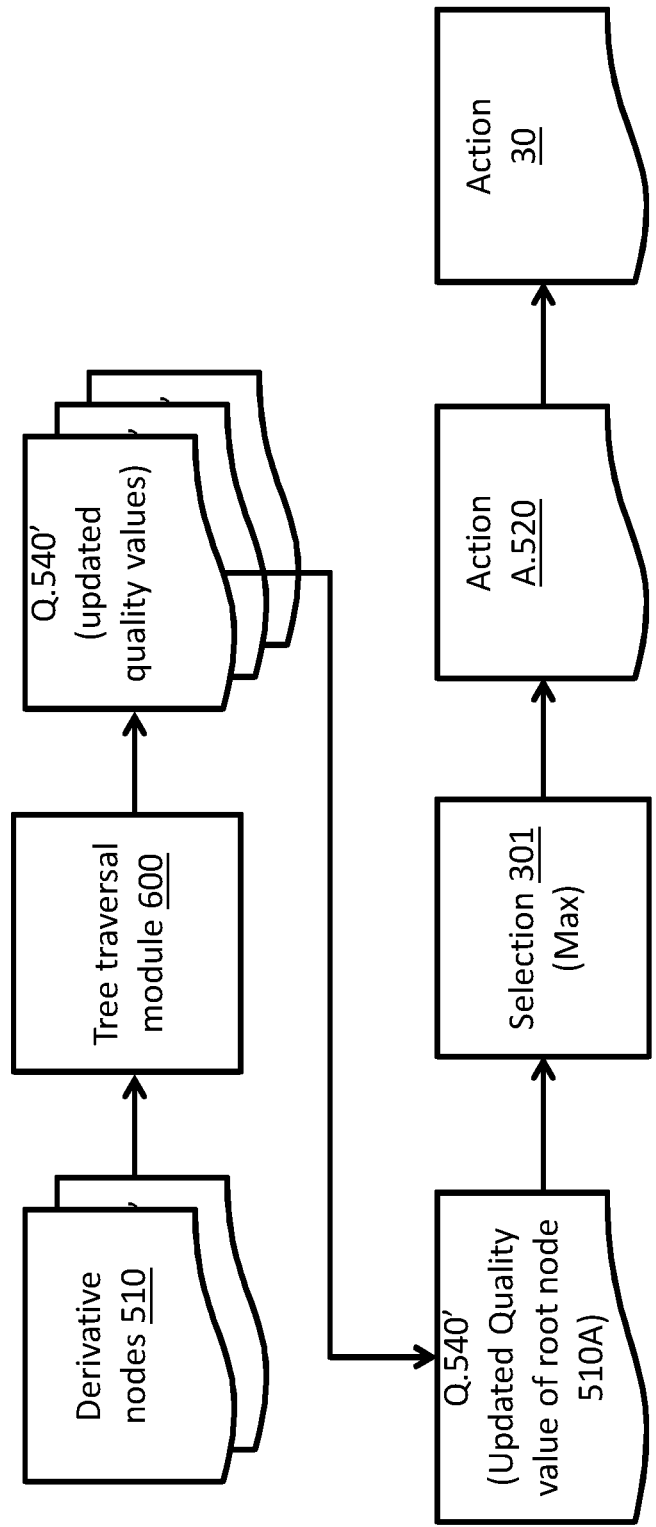

Reference is now made to FIG. 10A and FIG. 10B, which are block diagrams, jointly depicting an operational (e.g., driving) mode or stage of a system 10 for producing a policy of motion planning of an ADM, according to some embodiments.

As explained above in relation to FIG. 8, during an initial training stage, NN 300 may be trained according to at least one of the received data set 50' and the at least one updated quality factor to select at least one action of an actions' set 40, that may be applied to at least one element of ADM 1000. During the operational stage (e.g., in an autonomous driving mode), system 10 may conduct ADM 1000 according to the training of NN 300, as elaborated below. The embodiment depicted in FIG. 10A and 10B differs from that depicted in FIG. 9 in that during the operational stage (e.g., in an autonomous driving mode), system 10 may conduct ADM 1000 by a symbiosis of NN 300, mapper 210, simulator 400 and sensors 100, as elaborated below.

System 10 may receive, as an input from sensors 100 and/or from abstraction module 200 a temporal data set (e.g. 50 of FIG. 2) corresponding with at least a condition of ADM 1000 and/or an environment of ADM 1000. System 10 may be further configured to receive (e.g., from input device 7 of FIG. 1) a set of predefined selectable actions (e.g., 40 of FIG. 2).

Mapper 210 may receive data set 50 and produce at least one second data set (e.g. 50 of FIG. 2), corresponding with characteristics of a road, upon which the ADM is driving. For example, mapper 210 may be configured to produce a map, describing the relation of ADM 1000 to the real world (e.g., proximity to road edges, location and/or orientation of ADM 1000 in a lane, and the like). The map may be implemented as a data structure (e.g., a table that may be stored at storage 6 of FIG. 1) that may include for example a location of ADM 1000, ADM 1000 speed and orientation, the location of road shoulders in relation to ADM 1000, location of other objects (e.g., vehicles, pedestrians, etc.) in relation to ADM 1000 and the like.

Simulator 400 may create a root node (e.g., 510A of FIG. 3) of a search tree (e.g., 500 of FIG. 3), including at least one of the first received data set and the second received data set.

NN 300 may select (e.g., by selection module 301) one or more quality factor values (e.g. Q.540-B1) associated with node 510A and with one or more actions of the predefined selectable actions' set 40, according to at least one of data set 50 and/or data set 50' and according to the training of the NN 300, as elaborated above. For example, NN 300 may select two or more quality factors that have the highest value among quality factors associated with node 510A.

The one or more selected quality factors (e.g. Q.540-B1 of FIG. 3) may be associated with the first node 510A, and with one or more actions (e.g. A.520-B1) that may be applied therefrom. Thus, in effect, NN 300 may select at least one action A.520 to expand node 510A and so it serves as an expansion heuristic for search tree 500. In some embodiments, NN 300 may select two or more quality factors, associated with respective two or more actions A.520.

Simulator 400 may receive the at least one selected action (e.g. A.520-B1) from NN 300 and may predict a state of ADM 1000 after applying associated action 520-B1. Simulator 400 may expand search tree 500 by producing one or more derivative nodes 510 (e.g., 510-B1 of FIG. 3) and respective one or more reward factors (e.g., R.530-B1 of FIG. 3), that may correspond with the predicted state of ADM 1000 after applying associated action 520-B1. In some embodiments, simulator 400 may receive two or more selected actions from NN 300, and may expand tree 500 by producing two or more derivative nodes 510 accordingly.

Simulator 400 may associate node 510A to the at least one second node (e.g., 510-B1) by the selected action (e.g., A.520-B1) and produced reward (e.g., R.530-B1), as depicted in FIG. 3.

The iterative process described above of action selection by NN 300 and expansion of tree 500 may continue until a predefined termination condition is met (e.g., marked as 'T' states in FIG. 3). Termination condition T may include the same conditions as elaborated above, in the training process (e.g., an unacceptable condition of ADM 1000, a duration of elapsed time since the creation of the root state, exhaustion of computational resources of source tree 500 or simulator 400, and the like)

In some embodiments, termination condition T may further include conditions that may be imposed by the mapper, including for example: proximity to an obstacle on the road, passing a predefined percentage of ADM 1000 route on the map, and the like.

When termination condition T is met, tree traversal module 600 may apply a backward propagation process, e.g. by computing optimal sums of rewards as known in the art, along each trajectory or route of the expanded tree. Tree traversal module 600 may update the value of one or more quality factors Q.540 attributed to each node 510 and action A.520 along one or more trajectories or routes in the expanded search tree, as explained above in relation to the training process of NN 300.

NN 300 may select an updated quality factor value (e.g. Q.540-B1 of FIG. 3) from the one or more quality factors associated with root node 510A and an associated, respective action A.520 (e.g. A.520-B1 of FIG. 3).

System 10 may apply the action A.520 as an action 30 in the real world on at least one element (e.g., a steering wheel) of ADM 1000. For example, action A.520 may include one or more theoretical actions (e.g., reducing the speed, and changing the direction of the ADM), and system 10 may applied the actual actions as physical actions 30 on elements of the ADM (e.g., decreasing the pressure on a gas throttle, applying pressure on a braking system and applying an action on a steering mechanism or steering wheel).

System 10 may continuously or repetitively receive temporal data sets and produce a selection of actions as elaborated herein in relation to FIG. 10A and 10B, to continuously conduct ADM 1000 in response to the received temporal data sets.

Figure 11:
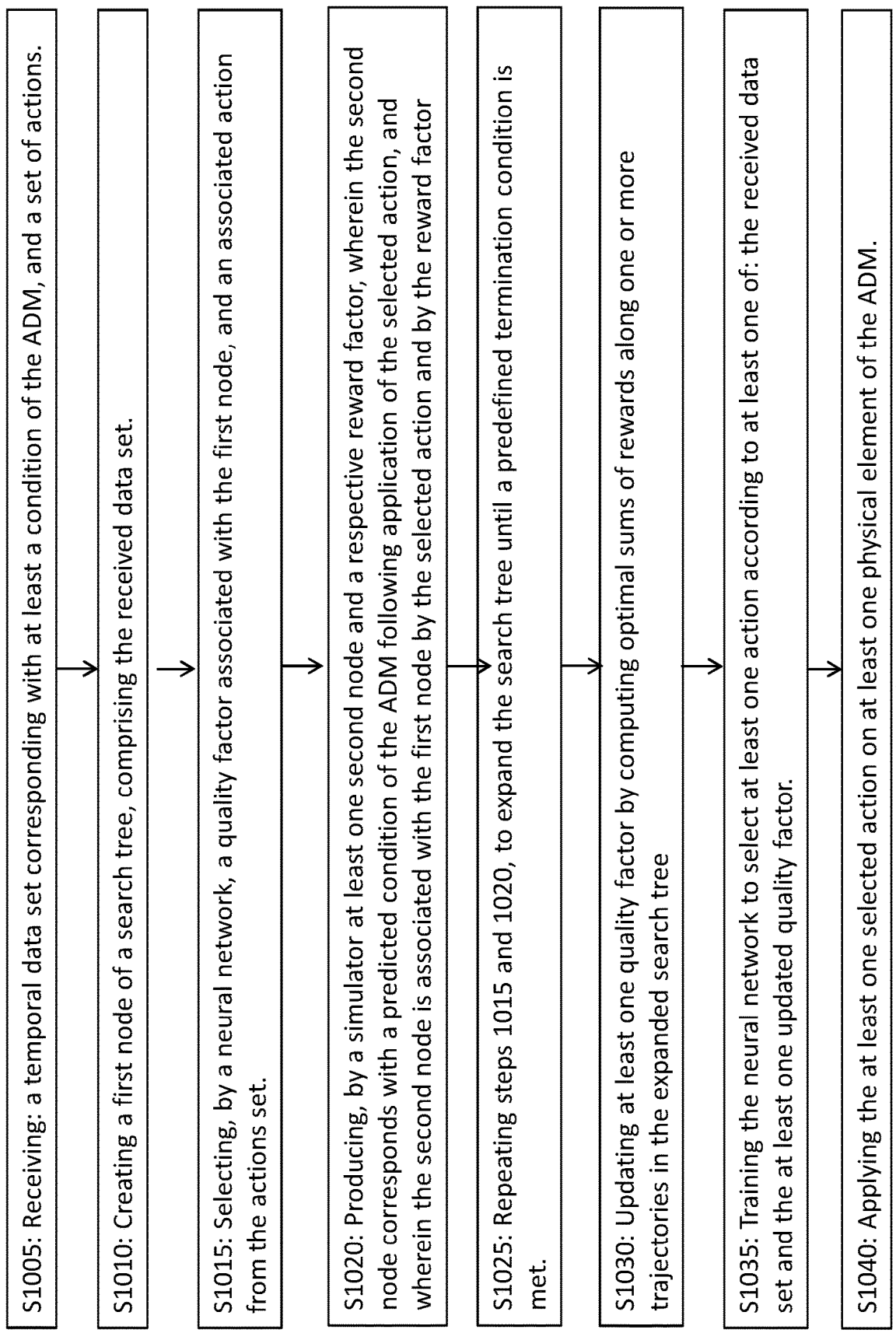
FIG. 11 depicts a method of producing a motion planning policy for an ADM, according to some embodiments.

Reference is now made to FIG. 11 which is a flow diagram depicting a method of producing a motion planning policy for an ADM by at least one processor.

As shown in step S1005, the processor may receive a temporal data set corresponding with at least a condition of the ADM (e.g., speed of the ADM, location of the ADM on a road lane, location and speed vector of additional objects in the ADM's vicinity, etc.) and a set of actions that may be applicable on the ADM (e.g., steer the ADM in a specified direction, modify the ADM's speed, etc.).

As shown in step S1010, the processor may create a first node (e.g., a root node) of a search tree, including the received data set. For example, the root node may include a data structure (e.g., a table) that may hold parameters associated with the ADM's condition and/or environment, as elaborated above.

As shown in step S1015, the processor may select, by a neural network, a quality factor, associated with the first node and an associated action from the actions set. The quality factor may initially have an arbitrary value and may be iteratively modified or updated to signify an optimal selection of an action, as explained herein.

As shown in step S1020, the processor may produce, by a simulator, at least one second node (e.g., a derivative node) and a respective reward factor. The second node may correspond with a predicted condition of the ADM following application of the selected action. The first node and the at least one second node may be associated, or interlinked by the selected action and by the reward factor.

As shown in step S1025, the processor may repeat or iterate steps S1015 and 1020, to expand the search tree until a predefined termination condition is met. For example, the processor may expand the tree until a predefined period has elapsed, until a predefined amount of computing resources has been exhausted, until the ADM has come to an unacceptable condition (e.g., an accident), etc. The expansion of the tree may be performed deterministically (e.g., by simulating and predicting all actions on all derivative nodes), or probabilistically (e.g., by randomly selecting one or more nodes to expand) or any combination thereof.

As shown in step S1030, the processor may update at least one quality factor by computing optimal sums of rewards along one or more trajectories in the expanded search tree. For example, the expanded tree may be traversed (e.g., by an A-star (A*) tree-search algorithm, an epsilon-greedy tree-search algorithm, and the like), to backward propagate along one or more trajectories of the expanded tree and update a value of one or more quality factors according to the Bellman equation.

As shown in step S1035, the processor may train the neural network according to at least one of the received data set and the at least one updated quality factor, to select at least one action. For example, the NN may be trained to select an action associated with the root node (e.g., corresponding to the current condition of the ADM).

As shown in step S1040, the processor may apply the at least one selected action on at least one physical element of the ADM. For example, in an operational mode (e.g. while driving the ADM), the processor may use the trained NN to produce an action (e.g., steer the ADM 5 degrees to the left) associated with a top-valued quality factor, and apply the action to a physical element (e.g., a steering wheel or steering device) of the ADM.

Embodiments of the present invention present an improvement over prior art in the field of autonomous driving machines (e.g., autonomous cars), in the symbiosis between its different components. Embodiments employ a deep reinforcement learning system, including a simulator (e.g., element 400 of Fig) for producing a search tree 500, including nodes representing conditions of the ADM, interlinked by respective actions and reward factors. The simulator collaborates with a neural network, configured to adaptively select optimal quality factors to expand the search tree, and train itself according to updated quality factors. This configuration may be applied to a periodic, partially observable environment such as a changing road. Such environments are materially different from prior environments where deep reinforcement learning has been implemented, including for example observable gaming environments, such as Go or chess board games.

Embodiments of the present invention provide partial observability (e.g., in a physical system like an autonomous vehicle) handling by partial randomization of a state produced by some action, with an unobservable part of the state randomly generated for each action-node transition. In contrast to prior environments for observable gaming environments, such as Go and Chess, which work for discrete environments and only optimize for binary win/lose conditions, embodiments of the present invention may allow continuous environment and optimization for both continuous quality (e.g., of driving an autonomous vehicle) as well as a binary 'accident' or 'no accident' condition. Such optimization may require usage of Bellman Equation which is not used (and not well suited) for Go/Chess tree search algorithms (e.g., MCTS implementation) and may be insensitive to replacement of such algorithms (e.g., MCTS) with tree-based Q-learning (e.g., learning quality factors) in the present invention.

In some embodiments, due to continuous nature of simulation (used for generation of states and/or nodes) and due to limited depth (prediction horizon) of the simulation for shallow tree algorithms, even simple simulators may not diverge too far from reality for short prediction time interval. Thus, embodiments of the present invention may use a simple and extremely fast simulator, with minimum computational resources during action (e.g., during driving time). During training time, simplicity of the simulator may not affect the quality of training since even though the training episode and/or tree depth could be quite long the tree and/or network applied during the operational stage (e.g., during driving) may have a relatively short time horizon, for example with orders of magnitude smaller than during training While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time. Various embodiments have been presented. Each of these embodiments may of course include features from other embodiments presented, and embodiments not specifically described may include various features described herein.

The invention claimed is:

1. A method comprising:
   a) obtaining, from at least one sensor, sensory data associated with an Autonomous Driving Machine (ADM);
   b) creating a first node of a search tree, comprising a temporal data set corresponding to at least one simulated condition of the ADM and at least one actual feature of the real world, wherein the temporal dataset is generated based on sensory data, wherein the search tree is configured to be utilized to facilitate a reinforcement learning for producing a motion planning policy for the ADM;
   c) selecting, by a neural network (NN), at least two initial quality factors comprising a first and a second quality factors, wherein each quality factor is associated with the first node and with an action selected from a set of actions, wherein the set of actions comprises actions configured to be applied on the ADM in accordance with a given condition of the ADM;
   d) producing, by a simulator, a first derivative node and a first reward factor, wherein the first derivative node and the first reward factor corresponds with a predicted condition of the ADM following application of a first selected simulated action, wherein the first derivative node is produced based on the first quality factors;
   e) producing, by the simulator, based on a second quality factor of the one or more quality factors, a second derivative node and a second reward factor, wherein the second derivative node and the second reward factor correspond with a predicted condition of the ADM following application of a second simulated action associated with the second quality factor, wherein the second derivative node is produced based on the second quality factor;
   f) repeating steps c-e until a predefined termination condition is met, wherein the predefined termination condition is associated with an unacceptable condition of the ADM, whereby creating, by the NN, an expanded search tree based on the sensory data and the at least two initial quality factors;
   g) updating at least one quality factor of the at least two initial quality factors, wherein said updating comprises computing optimal sums of rewards along one or more trajectories in the expanded search tree; and
   h) training the NN to select at least one action according to at least one of:
   the temporal data set and the at least one updated quality factor, whereby said training the NN is performed based on simulation of actions produced by the expanded search tree, wherein the NN is configured to be utilized for producing a motion planning policy for the ADM.

2. The method of claim 1, wherein the search tree is expanded by a global, deterministic tree traversal algorithm, and wherein the at least two initial quality factors received from the NN serve as an expansion heuristic, to select one or more actions of the set of actions.

3. The method of claim 2, wherein updating the at least one quality factor is performed by backward-propagating along one or more trajectories of the expanded tree and accumulating optimal rewards according to Bellman's equation.

4. The method of claim 3, wherein the tree traversal algorithm is one of an A-star (A*) tree-search algorithm and an epsilon-greedy tree-search algorithm.

5. The method of claim 1, wherein said at least one actual feature of the real world is selected from a list comprising: a condition of the ADM, a characteristic of the ADM, a condition of the road, and a characteristic of the road.

6. The method of claim 5, wherein said creating the first node further comprising:
   repeatedly sampling data of the real world by the at least one sensor, according to a preset period of time;
   applying an abstraction of the sampled data, to produce the temporal data set; and
   extracting at least one feature of the temporal data set, corresponding to a feature of the real world,
   wherein the first node of the search tree corresponds with the feature of the real world.

7. The method of claim 5, wherein said creating the first node further comprising producing the temporal data set by the simulator.

8. The method of claim 5, further comprises utilizing ing the NN to produce a motion planning policy for the ADM, wherein said utilizing comprises:
   a) obtaining a data set corresponding to at least one actual condition of the ADM and at least one actual feature of the real world, wherein the dataset is determined based on real time sensory data obtained from the at least one sensor;
   b) selecting, by the NN at least one action of the set of actions according to said training of the NN, and according to the data set;
   c) applying the selected action to at least one element of the ADM; and
   d) repeating steps a through c, to continuously conduct the ADM in response to the received data sets.

9. A method for producing a motion planning policy for an Autonomous Driving Machine (ADM), the method comprising:
   producing, by a simulator, a search tree, comprising a root node and plurality of derivative nodes, linked to the root node, wherein the root node represents a simulated current condition of the ADM, and wherein each derivative node represents a predicted condition of the ADM, following application of an simulated action on the ADM, and wherein the nodes are interlinked by said actions and associated quality factors;
   selecting, by a neural network (NN), a plurality of quality factors;
   expanding the search tree by the simulator to add interlinked derivative nodes according to the NN's selection, until a terminating condition is met, wherein the predefined termination condition is associated with an unacceptable condition of the ADM, whereby the added interlinked derivative nodes are produced based on the selected plurality of quality factors;
   backward propagating along one or more trajectories of the expanded tree, to update a value of one or more quality factors from the plurality of quality factors;
   training the NN according to the simulated current condition of the ADM and the updated one or more quality factors to select an optimal action, whereby said training the NN is performed based on simulation of actions produced by the expanded- search tree; and applying the selected optimal action on at least one physical element of the ADM.

10. The method of claim 9, wherein the search tree is expanded by a global, deterministic tree traversal algorithm, and wherein a quality factor received from the neural network serves as an expansion heuristic, to select one or more actions of the actions' set.

11. The method of claim 9, wherein the search tree is expanded by a local, probabilistic tree traversal algorithm, and wherein updating the at least one quality factor is performed by accumulating the rewards along nodes of the trajectory of the expanded tree.

12. A System for producing a motion planning policy for an Autonomous Driving Machine (ADM), the system comprising a non-transitory memory device, wherein modules of instruction code are stored, and a processor associated with the memory device, and configured to execute the modules of instruction code, whereupon execution of said modules of instruction code, the processor is further configured to perform at least one of:

produce, by a simulator included in the system, a search tree, comprising a root node and plurality of derivative nodes, linked to the root node, wherein the root node represents a simulated current condition of the ADM, and wherein each derivative node represents a predicted condition of the ADM, following application of an action on the ADM, and wherein the nodes are interlinked by said actions and associated quality factors;

select, by a neural network (NN) included in the system, a plurality of quality factors;

expand the search tree by the simulator to add interlinked derivative nodes according to the NN's selection, until a terminating condition is met, wherein the predefined termination condition is associated with an unacceptable condition of the ADM, whereby the added interlinked derivative nodes are produced based on the selected plurality of quality factors;

backward propagate along one or more trajectories of the expanded tree, to update a value of one or more quality factors from the plurality of quality factors;

train the NN according to the simulated current condition of the ADM and the updated one or more quality factors to select an optimal action, whereby said training the NN is performed based on simulation of actions produced by the expanded- search tree; and apply the selected optimal action on at least one physical element of the ADM.

13. The system of claim 12, wherein the processor is further configured to:

attribute a numerical reward value to each action; and update the at least one quality factor by accumulating optimal reward values along two or more trajectories of the expanded tree, according to Bellman's equation.

14. The system of claim 12, wherein the processor is configured to:

expand the search tree according to a global, deterministic tree traversal algorithm; and use a quality factor received from the neural network as an expansion heuristic, to select one or more actions of the actions' set.

15. The method of claim 12, wherein the processor is configured to:

expanded the search tree according to a local, probabilistic tree traversal algorithm; and update the at least one quality factor is by accumulating the rewards along nodes of the trajectory of the expanded tree.

16. A method of autonomously driving an Autonomous Driving Machine (ADM), the method comprising:

a) creating a first node of a search tree, comprising at least one first data set corresponding with at least a condition of the ADM and a derivative temporal data set corresponding with characteristics of a road;

b) selecting, by a neural network, a quality factor, associated with the first node and an associated action from a set of actions, wherein the action is selected based on the selected quality factor;

c) producing, by a simulator at least one derivative node and a respective reward factor, wherein the derivative node corresponds with a predicted condition of the ADM following application of the selected action, and wherein the derivative node is associated with the first node by the selected action and by the reward factor, whereby the at least one derivative node is produced based on the selected quality factor;

d) repeating steps b and c, to expand the search tree until a termination condition is met, wherein the predefined termination condition is associated with an unacceptable condition of the ADM;

e) updating at least one quality factor by computing optimal sums of rewards along one or more trajectories in the expanded search tree;

f) selecting, by the neural network, at least one action of the predefined selectable actions set according to the at least one updated quality factors and applying the selected action to at least one element of the ADM; and g) repeating steps a through g to continuously conduct the ADM in response to the received data sets.

17. The method of claim 16, further comprising:

a) receiving an abstraction of at least one real-world feature; and b) producing a map of a portion of a road upon which the ADM is driving, c) wherein the map includes the relation of ADM to at least one of the real-world road and real-world objects included therein, and wherein the second temporal data set comprises the map.

18. The method of claim 1, wherein the one or more quality factors comprise a first and a second quality factors;

wherein said creating the expanded search tree comprises adding a first and a second sets of interlinked derivative nodes;

wherein said updating comprises updating the first and the second quality factors;

wherein said training is performed based on the first and second updated quality factors.

19. The method of claim 9, wherein the plurality of quality factors selected by the NN comprise a predefined number of top-valued quality factors, whereby expanding the search tree by the predefined number of trajectories respective to predefined number of top-valued quality factors, wherein said updating the value of the one or more quality factors comprises updating values of the predefined number of top-valued quality factors, and wherein said training is performed based on the predefined number of top-valued quality factors.

20. The method of claim 9, wherein the plurality of quality factors selected by the NN comprise all quality factors having a value above a predetermined threshold, whereby expanding the search tree by a number of trajectories respective to the all quality factors having a value above the predetermined threshold, wherein said updating the value of the one or more quality factors comprises updating values of all quality factors having a value above the predetermined threshold, and wherein said training is performed based on all quality factors having a value above the predetermined threshold.

* * * * *